(12) United States Patent
Ma et al.

(10) Patent No.: US 11,424,854 B2
(45) Date of Patent: Aug. 23, 2022

(54) PDCCH SENDING METHOD AND APPARATUS, AND PDCCH BLIND DETECTION METHOD AND APPARATUS

(71) Applicant: HUAWEI TECHNOLOGIES CO., LTD., Shenzhen (CN)

(72) Inventors: Ruixiang Ma, Beijing (CN); Shengyu Li, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 37 days.

(21) Appl. No.: 17/148,861

(22) Filed: Jan. 14, 2021

(65) Prior Publication Data

US 2021/0143937 A1 May 13, 2021

Related U.S. Application Data

(63) Continuation of application No. PCT/CN2019/096104, filed on Jul. 16, 2019.

(30) Foreign Application Priority Data

Jul. 18, 2018 (CN) .......................... 201810792879.6

(51) Int. Cl.
*H04L 1/00* (2006.01)
*H04W 72/04* (2009.01)
*H04L 5/00* (2006.01)

(52) U.S. Cl.
CPC .......... *H04L 1/0038* (2013.01); *H04L 5/0094* (2013.01); *H04W 72/042* (2013.01)

(58) Field of Classification Search
CPC ... H04L 1/0038; H04L 5/0094; H04W 72/042
See application file for complete search history.

(56) References Cited

U.S. PATENT DOCUMENTS

2021/0351865 A1\* 11/2021 Ouchi ................... H04W 24/00

FOREIGN PATENT DOCUMENTS

| CN | 101702828 A | 5/2010 |
| CN | 101883369 A | 11/2010 |

(Continued)

OTHER PUBLICATIONS

Huawei and HiSilicon, Remaining issues on search space. 3GPP TSG RAN WG1 Meeting #93, Busan, Korea, May 21-25, 2018, R1-1805881, 7 pages.

(Continued)

*Primary Examiner* — Ronald B Abelson
(74) *Attorney, Agent, or Firm* — Maier & Maier, PLLC

(57) ABSTRACT

A PDCCH sending method and apparatus, and a PDCCH blind detection method and apparatus are provided. The method includes: determining, by a terminal device, a blind detection capability of the terminal device; performing, by the terminal device, PDCCH blind detection in one time unit based on PDCCH configuration information and the blind detection capability of the terminal device, where the blind detection capability of the terminal device includes N maximum quantities, of blind detection times, corresponding to N subcarrier spacings in the time unit and/or N maximum quantities, of channel estimation control channel elements CCEs, corresponding to the N subcarrier spacings in the time unit, where N is a positive integer.

20 Claims, 5 Drawing Sheets

(56) References Cited

FOREIGN PATENT DOCUMENTS

| | | |
|---|---|---|
| CN | 102883368 A | 1/2013 |
| CN | 103874096 A | 6/2014 |
| CN | 104144502 A | 11/2014 |
| CN | 107359967 A | 11/2017 |
| CN | 107370562 A | 11/2017 |
| WO | 2011160285 A1 | 12/2011 |
| WO | 2012003675 A1 | 1/2012 |
| WO | 2020227142 A1 | 11/2020 |

OTHER PUBLICATIONS

Ericsson, Search Space Design for URLLC. 3GPP TSG-RAN WG1 Meeting #93, Busan, Korea, May 21-25, 2018, R1-1806019, 5 pages.
NTT Docomo, Inc., Remaiming details on search space. 3GPP TSG RAN WG1 Meeting 91, Reno, USA, Nov. 27-Dec. 1, 2017, R1-1720812, 9 pages.
Ericsson. "On HARQ Management." 3GPP TSG RAN1 WG1 Meeting #91, R1-1721013. Reno, USA. Nov. 27-Dec. 1, 2017. 11 pages.
Nokia et al. "On the hierarchical search space and UE blind detection." 3GPP TSG RAN WG1#89, R1-1708503. Hangzhou, P.R. China. May 15-19, 2017. 3 pages.

* cited by examiner

PDCCH SENDING METHOD AND APPARATUS, AND PDCCH BLIND DETECTION METHOD AND APPARATUS

CROSS-REFERENCE TO RELATED APPLICATIONS

This application is a continuation of International Application No. PCT/CN2019/096104, filed on Jul. 16, 2019, which claims priority to Chinese Patent Application No. 201810792879.6, filed on Jul. 18, 2018. The disclosures of the aforementioned applications are hereby incorporated by reference in their entireties.

TECHNICAL FIELD

The embodiments relate to the field of communications technologies, and in particular, to a physical downlink control channel (PDCCH) sending method and apparatus, and a PDCCH blind detection method and apparatus.

BACKGROUND

In a mobile communications system, a PDCCH sent by a base station carries downlink control information (DCI), and the DCI is used to indicate information such as a time-frequency resource of a physical downlink shared channel (PDSCH). However, the base station does not indicate, to a terminal device, a specific time-frequency resource location for sending the PDCCH, and the terminal device needs to perform PDCCH blind detection. When performing PDCCH blind detection, the terminal device needs to perform PDCCH blind detection in a search space configured by the base station. A configuration of the PDCCH search space may be less than one slot. To be specific, in one slot, the terminal device may perform blind detection for a plurality of times and perform channel estimation.

In a $5^{th}$ generation (5G) mobile communications system, an ultra-reliable and low latency communications (URLLC) service is defined. Main application scenarios of the URLLC service include self-driving, telemedicine, remote automatic control, and the like. These application scenarios require that data transmission reliability be as high as 99.999% and require that a data transmission latency be less than 1 ms.

In the URLLC service, how a terminal device can quickly and reliably perform PDCCH blind detection to meet data transmission reliability and latency requirements and can reduce power consumption and processing complexity as much as possible is an urgent problem to be resolved.

SUMMARY

Embodiments provide a PDCCH sending method and apparatus, and a PDCCH blind detection method and apparatus, to resolve a problem of how to quickly and reliably perform PDCCH blind detection and reduce power consumption and processing complexity as much as possible.

According to a first aspect, an embodiment provides a PDCCH blind detection method. The method includes the following:

A terminal device determines a blind detection capability of the terminal device; and the terminal device performs PDCCH blind detection in one time unit based on PDCCH configuration information and the blind detection capability of the terminal device. The blind detection capability of the terminal device includes N maximum quantities of blind detection times corresponding to N subcarrier spacings in the time unit and/or N maximum quantities, of channel estimation control channel elements (CCEs) corresponding to the N subcarrier spacings in the time unit, where N is a positive integer. For one of the N subcarrier spacings, a first ratio is greater than a second ratio, and for a subcarrier spacing other than the one subcarrier spacing in the N subcarrier spacings, a first ratio is not less than a second ratio; and/or for the one subcarrier spacing, a third ratio is greater than a fourth ratio, and for the subcarrier spacing other than the one subcarrier spacing in the N subcarrier spacings, a third ratio is not less than a fourth ratio. The first ratio is a ratio of a maximum quantity of blind detection times that corresponds to the subcarrier spacing to a quantity of symbols included in the time unit. The second ratio is a ratio of a reference quantity of blind detection times that corresponds to the subcarrier spacing to a quantity of symbols included in one slot. The third ratio is a ratio of a maximum quantity of channel estimation CCEs that corresponds to the subcarrier spacing to the quantity of symbols included in the time unit. The fourth ratio is a ratio of a reference quantity of channel estimation CCEs that corresponds to the subcarrier spacing to the quantity of symbols included in one slot.

According to the foregoing method, for the blind detection capability of the terminal, compared with a reference quantity of blind detection times and/or a reference quantity of channel estimation CCEs in the current technology, a quantity of blind detection times of the terminal device in one time unit is correspondingly increased, so that a quantity of opportunities of scheduling a URLLC service for the terminal device in one time unit is increased, thereby reducing a URLLC service latency for the terminal device; and a quantity of channel estimation CCEs of the terminal device in one time unit is correspondingly increased, so that a quantity of CCEs constituting a PDCCH in one time unit is increased, thereby ensuring URLLC service reliability. Because the terminal has the foregoing blind detection capability, the terminal device can quickly and reliably perform PDCCH blind detection and reduce power consumption and processing complexity as much as possible.

In an optional implementation, the time unit is one slot.

In an optional implementation, when N is equal to 4, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, where $1 \leq i \leq 4$, W1 is greater than 1, W2, W3, and W4 are greater than or equal to 1, and the following conditions are satisfied: $W1 \geq W2 \geq W3 \geq W4$, and at least one of W1 to W4 is not equal to 2; or when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, where $1 \leq i \leq 4$, Z1 is an integer greater than 0, Z2, Z3, and Z4 are integers greater than or equal to 0, and the following conditions are satisfied: $Z1 \geq Z2 \geq Z3 \geq Z4$, and at least one of Z1 to Z4 is not equal to a reference quantity of blind detection times that corresponds to a corresponding subcarrier spacing.

According to the foregoing method, compared with a reference quantity of blind detection times in the current technology, a quantity of blind detection times of the terminal device in one time unit is correspondingly increased, so that a quantity of opportunities of scheduling a URLLC service for the terminal device in one time unit is increased, thereby reducing a URLLC service latency for the terminal device.

In an optional implementation, when N is equal to 4, in ascending order of the N subcarrier spacings, a maximum quantity of channel estimation CCEs that corresponds to the $i^{th}$ subcarrier spacing is Xi times a reference quantity of channel estimation CCEs that corresponds to the $i^{th}$ subcarrier spacing, where $1 \leq i \leq 4$, X1 is greater than 1, X2 to X4 are greater than or equal to 1, and the following conditions are satisfied: $X1 \geq X2 \geq X3 \geq X4$, and at least one of X1 to X4 is not equal to 2; or when N is equal to 4, in ascending order of the N subcarrier spacings, a maximum quantity of channel estimation CCEs that corresponds to the $i^{th}$ subcarrier spacing is increased by Yi compared with a reference quantity of channel estimation CCEs that corresponds to the $i^{th}$ subcarrier spacing, where $1 \leq i \leq 4$, Y1 is an integer not equal to 0, Y2 to Y4 are integers greater than or equal to 0, and the following conditions are satisfied: $Y1 \geq Y2 \geq Y3 \geq Y4$, and at least one of Y1 to Y4 is not equal to a maximum quantity of channel estimation CCEs that corresponds to a corresponding subcarrier spacing.

According to the foregoing method, compared with a reference quantity of channel estimation CCEs in the current technology, a quantity of channel estimation CCEs of the terminal device in one time unit is correspondingly increased, so that a quantity of CCEs constituting a PDCCH in one time unit is increased, thereby ensuring URLLC service reliability.

In an optional implementation, the time unit is a half slot.

In an optional implementation, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, where $1 \leq i \leq 4$, W1 is greater than 1, W2, W3, and W4 are greater than or equal to 1, and W1 to W4 satisfy the following condition: $W1 \geq W2 \geq W3 \geq W4$; or when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, where $1 \leq i \leq 4$, Z1 is an integer greater than 0, Z2 to Z4 are integers greater than or equal to 0, and the following condition is satisfied: $Z1 \geq Z2 \geq Z3 \geq Z4$.

According to the foregoing method, compared with a reference quantity of blind detection times in the current technology, a quantity of blind detection times of the terminal device in one time unit is correspondingly increased, so that a quantity of opportunities of scheduling a URLLC service for the terminal device in one time unit is increased, thereby reducing a URLLC service latency for the terminal device.

In an optional implementation, when N is equal to 4, in ascending order of the N subcarrier spacings, a maximum quantity of channel estimation CCEs that corresponds to the $i^{th}$ subcarrier spacing is Xi times a reference quantity of channel estimation CCEs that corresponds to the $i^{th}$ subcarrier spacing, where $1 \leq i \leq 4$, X1 is greater than 1, X2 to X4 are greater than or equal to 1, and the following condition is satisfied: $X1 \geq X2 \geq X3 \geq X4$; or when N is equal to 4, in ascending order of the N subcarrier spacings, a maximum quantity of channel estimation CCEs that corresponds to the $i^{th}$ subcarrier spacing is increased by Yi compared with a reference quantity of channel estimation CCEs that corresponds to the $i^{th}$ subcarrier spacing, where $1 \leq i \leq 4$, Y1 is an integer not equal to 0, Y2 to Y4 are integers greater than or equal to 0, and the following condition is satisfied: $Y1 \geq Y2 \geq Y3 \geq Y4$.

According to the foregoing method, compared with a reference quantity of channel estimation CCEs in the current technology, a quantity of channel estimation CCEs of the terminal device in one time unit is correspondingly increased, so that a quantity of CCEs constituting a PDCCH in one time unit is increased, thereby ensuring URLLC service reliability.

In an optional implementation, for the $i^{th}$ subcarrier spacing, Zi and Yi satisfy $Zi \leq Yi \leq p \times Zi$, where p is greater than 1 and less than or equal to 16.

In the foregoing method, Zi and Yi are further limited, so that an increase in a quantity of blind detection times and an increase in a quantity of channel estimation CCEs remain at a specific ratio. This avoids the following case: an increase in one of the quantities is excessively large whereas an increase in the other quantity is excessively small, resulting in mutual constraining between reliability and a latency of a URLLC service of the terminal device, and consequently, the reliability and latency of the URLLC service cannot be ensured at the same time.

In an optional implementation, when N is equal to 4, in ascending order of the N subcarrier spacings, a maximum quantity of blind detection times that corresponds to the $i^{th}$ subcarrier spacing is 1/Wi of a reference quantity of blind detection times that corresponds to the $i^{th}$ subcarrier spacing, where $1 \leq i \leq 4$, W1, W2, and W3 are greater than or equal to 1, W4 is greater than 1, and W1 to W4 satisfy the following condition: $W1 \leq W2 \leq W3 \leq W4 \geq 2$; or when N is equal to 4, in ascending order of the N subcarrier spacings, a maximum quantity of blind detection times that corresponds to the $i^{th}$ subcarrier spacing is decreased by Zi compared with a reference quantity of blind detection times that corresponds to the $i^{th}$ subcarrier spacing, where $1 \leq i \leq 4$, Z1 to Z3 are integers greater than or equal to 0, Z4 is an integer greater than 0, and the following conditions are satisfied: $Z1 \leq Z2 \leq Z3 \leq Z4$, and $Zi < Z_B i/2$, where $Z_B i$ is the reference quantity of blind detection times that corresponds to the $i^{th}$ subcarrier spacing.

In this implementation, one time unit is a half slot, which is half of that in an existing mobile communications protocol. Although a quantity of blind detection times of the terminal device in one time unit is decreased, a subtracted quantity of times is less than a half of a reference quantity of blind detection times, and the quantity of blind detection times of the terminal device in one time unit is still increased compared with that in the existing communications protocol. Therefore, a quantity of opportunities of scheduling a URLLC service for the terminal device in one time unit can be increased, thereby reducing a URLLC service latency for the terminal device.

In an optional implementation, when N is equal to 4, in ascending order of the N subcarrier spacings, a maximum quantity of channel estimation CCEs that corresponds to the $i^{th}$ subcarrier spacing is 1/Xi of a reference quantity of channel estimation CCEs that corresponds to the $i^{th}$ subcarrier spacing, where $1 \leq i \leq 4$, X1, X2, and X3 are greater than or equal to 1, X4 is greater than 1, and X1 to X4 satisfy the following condition: $X1 \leq X2 \leq X3 \leq X4 \geq 2$; or when N is equal to 4, in ascending order of the N subcarrier spacings, a maximum quantity of channel estimation CCEs that corresponds to the $i^{th}$ subcarrier spacing is decreased by Yi compared with a reference quantity of channel estimation CCEs that corresponds to the $i^{th}$ subcarrier spacing, where $1 \leq i \leq 4$, Y1 to Y3 are integers greater than 0, Y4 is an integer not equal to 0, and the following conditions are satisfied: Y1≤Y2≤Y3≤Y4, and Yi≤$Y_B$i/2, where $Y_B$i is the reference quantity of channel estimation CCEs that corresponds to the $i^{th}$ subcarrier spacing.

In this implementation, one time unit is a half slot, which is half of a slot size stipulated in an existing mobile communications protocol. Although a quantity of channel estimation CCEs for channel estimation by the terminal device in one time unit is decreased, a subtracted quantity is less than a half of a reference quantity of channel estimation CCEs. This is equivalent to that a quantity of CCEs that can be used for PDCCH transmission in one time unit is increased. Therefore, URLLC service reliability is improved.

In an optional implementation, the PDCCH configuration information includes at least one aggregation level and a quantity of candidate PDCCHs at each of the at least one aggregation level in a half slot.

In an optional implementation, the PDCCH configuration information includes a quantity b of symbols occupied by a control resource set and O start symbol locations of the control resource set, where O>0, and b>0. The quantity b of symbols occupied by the control resource set and the O start symbol locations are used to determine a time-domain symbol location occupied by each of O blind detection occasions, and each of the O blind detection occasions occupies b symbols.

In an optional implementation, the b symbols occupied by each of the O blind detection occasions do not cross two different time units, or do not cross a boundary of the time unit.

According to the foregoing method, a problem that a quantity of blind detection times and/or a quantity of channel estimation CCEs cannot be counted because a blind detection occasion crosses a boundary of a time unit is avoided.

In an optional implementation, the PDCCH configuration information further includes a first quantity of candidate PDCCHs at each of the at least one aggregation level on one blind detection occasion, and the performing, by the terminal device, PDCCH blind detection in one time unit based on the PDCCH configuration information and the blind detection capability of the terminal device includes:

determining, by the terminal device based on the PDCCH configuration information, a second quantity of candidate PDCCHs on which the terminal device needs to perform blind detection in the time unit, where the second quantity of candidate PDCCHs on which blind detection needs to be performed in the time unit is a sum of second quantities of candidate PDCCHs on which blind detection needs to be performed in the time unit on all of the O blind detection occasions, and a second quantity of candidate PDCCHs on which blind detection needs to be performed in the time unit on any one of the O blind detection occasions is at least one of the following:

in b symbols occupied by any one of the O blind detection occasions, if the first a symbols are located in the time unit, and the last (b-a) symbols are not located in the time unit, a corresponding second quantity of candidate PDCCHs is 0 or P×a/b, where a<b, $$P = \sum_L \{M^{(L)}\},$$

and $M^{(L)}$ is a first quantity of candidate PDCCHs at an aggregation level L in the at least one aggregation level on one blind detection occasion; or in b symbols occupied by any one of the O blind detection occasions, if the last c symbols are located in the time unit, and the first (b-c) symbols are not located in the time unit, a corresponding second quantity of candidate PDCCHs is 0, P×c/b, or P, where c<b; or if b symbols occupied by any one of the O blind detection occasions are all located in the time unit, a corresponding second quantity of candidate PDCCHs is P; or if none of b symbols occupied by any one of the O blind detection occasions is located in the time unit, a corresponding quantity of candidate PDCCHs is 0; and performing, by the terminal device, blind detection on the PDCCH in the time unit based on the second quantity of candidate PDCCHs on which the terminal device needs to perform blind detection in the time unit and the blind detection capability of the terminal device.

In an optional implementation, the PDCCH configuration information further includes a first quantity of candidate PDCCHs at each of the at least one aggregation level in one slot, and the performing, by the terminal device, PDCCH blind detection in one time unit based on the PDCCH configuration information and the blind detection capability of the terminal device includes:

determining, by the terminal device based on the PDCCH configuration information, a second quantity of candidate PDCCHs on which the terminal device needs to perform blind detection in the time unit, where the second quantity of candidate PDCCHs on which blind detection needs to be performed in the time unit is a sum of second quantities of candidate PDCCHs on which blind detection needs to be performed in the time unit on all of the O blind detection occasions, and a second quantity of candidate PDCCHs on which blind detection needs to be performed in the time unit on any one of the O blind detection occasions is at least one of the following:

in b symbols occupied by any one of the O blind detection occasions, if the first a symbols are located in the time unit, and the last (b-a) symbols are not located in the time unit, a corresponding second quantity of candidate PDCCHs is 0 or P×a/b, where a<b, $$P = \sum_L \{M^{(L)}/O\},$$

$M^{(L)}$ is a first quantity of candidate PDCCHs at an aggregation level L in the at least one aggregation level in one slot, and {.} represents a rounding operation; or in b symbols occupied by any one of the O blind detection occasions, if the last c symbols are located in the time unit, and the first (b-c) symbols are not located in the time unit, a corresponding second quantity of candidate PDCCHs is 0, P×c/b, or P, where c<b; or if b symbols occupied by any one of the O blind detection occasions are all located in the time unit, a corresponding second quantity of candidate PDCCHs is P; or if none of b symbols occupied by any one of the O blind detection occasions is located in the time unit, a corresponding second quantity of candidate PDCCHs is 0; and performing, by the terminal device, blind detection on the PDCCH in the time unit based on the second quantity of candidate PDCCHs on which the terminal device needs to perform blind detection in the time unit and the blind detection capability of the terminal device.

According to a second aspect, an embodiment provides a PDCCH blind detection apparatus. The apparatus has a function of implementing behaviors of the terminal device in the foregoing method implementations. The function may be implemented by hardware or may be implemented by executing corresponding software by hardware. The hardware or software includes one or more modules corresponding to the function, for example, includes a processing unit and a transceiver unit. The modules may be software and/or hardware, and are respectively configured to implement the steps in the foregoing method.

According to a third aspect, an embodiment provides another PDCCH blind detection apparatus. For example, the apparatus may be a terminal device, a structure of the terminal device includes a transceiver and a processor, and the processor controls an operation used for determining a blind detection capability of the terminal device, and the like. The transceiver is configured to support the terminal device in performing an operation such as PDCCH blind detection in one time unit based on PDCCH configuration information and the blind detection capability of the terminal device.

According to a fourth aspect, an embodiment provides a computer readable storage medium. The computer storage medium stores a computer readable instruction. When a computer reads and executes the computer readable instruction, the computer is enabled to perform the method according to any one of the first aspect or the possible implementations of the first aspect.

According to a fifth aspect, an embodiment provides a computer program product. When a computer reads and executes the computer program product, the computer is enabled to perform the method according to any one of the first aspect or the possible implementations of the first aspect.

According to a sixth aspect, an embodiment provides a chip. The chip is connected to a memory and is configured to read and execute a software program stored in the memory, to implement the method according to any one of the first aspect or the possible implementations of the first aspect.

According to a seventh aspect, an embodiment provides a PDCCH sending method, including the following:

A network device determines PDCCH configuration information, and the network device sends a PDCCH to a terminal device based on the PDCCH configuration information and a blind detection capability of the terminal device.

The blind detection capability of the terminal device includes N maximum quantities of blind detection times corresponding to N subcarrier spacings in the one time unit and/or N maximum quantities of channel estimation control channel elements CCEs corresponding to the N subcarrier spacings in the time unit, where N is a positive integer. For one of the N subcarrier spacings, a first ratio is greater than a second ratio, and for a subcarrier spacing other than the one subcarrier spacing in the N subcarrier spacings, a first ratio is not less than a second ratio; and/or for the one subcarrier spacing, a third ratio is greater than a fourth ratio, and for the subcarrier spacing other than the one subcarrier spacing in the N subcarrier spacings, a third ratio is not less than a fourth ratio. The first ratio is a ratio of a maximum quantity of blind detection times that corresponds to the subcarrier spacing to a quantity of symbols included in the time unit. The second ratio is a ratio of a reference quantity of blind detection times that corresponds to the subcarrier spacing to a quantity of symbols included in one slot. The third ratio is a ratio of a maximum quantity of channel estimation CCEs that corresponds to the subcarrier spacing to the quantity of symbols included in the time unit. The fourth ratio is a ratio of a reference quantity of channel estimation CCEs that corresponds to the subcarrier spacing to the quantity of symbols included in one slot.

According to the foregoing method, for the blind detection capability of the terminal, compared with a reference quantity of blind detection times and/or a reference quantity of channel estimation CCEs in the current technology, a quantity of blind detection times of the terminal device in one time unit is correspondingly increased, so that a quantity of opportunities of scheduling a URLLC service for the terminal device in one time unit is increased, thereby reducing a URLLC service latency for the terminal device; and a quantity of channel estimation CCEs of the terminal device in one time unit is correspondingly increased, so that a quantity of CCEs constituting a PDCCH in one time unit is increased, thereby ensuring URLLC service reliability. Because the terminal has the foregoing blind detection capability, the terminal device can quickly and reliably perform PDCCH blind detection and reduce power consumption and processing complexity as much as possible.

In an optional implementation, the time unit is one slot.

In an optional implementation, when N is equal to 4, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, where $1 \leq i \leq 4$, W1 is greater than 1, W2, W3, and W4 are greater than or equal to 1, and the following conditions are satisfied: $W1 \geq W2 \geq W3 \geq W4$, and at least one of W1 to W4 is not equal to 2; or when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, where $1 \leq i \leq 4$, Z1 is an integer greater than 0, Z2, Z3, and Z4 are integers greater than or equal to 0, and the following conditions are satisfied: $Z1 \geq Z2 \geq Z3 \geq Z4$, and at least one of Z1 to Z4 is not equal to a reference quantity of blind detection times that corresponds to a corresponding subcarrier spacing.

In an optional implementation, when N is equal to 4, in ascending order of the N subcarrier spacings, a maximum quantity of channel estimation CCEs that corresponds to the $i^{th}$ subcarrier spacing is Xi times a reference quantity of channel estimation CCEs that corresponds to the $i^{th}$ subcarrier spacing, where $1 \leq i \leq 4$, X1 is greater than 1, X2 to X4 are greater than or equal to 1, and the following conditions are satisfied: $X1 \geq X2 \geq X3 \geq X4$, and at least one of X1 to X4 is not equal to 2; or when N is equal to 4, in ascending order of the N subcarrier spacings, a maximum quantity of channel estimation CCEs that corresponds to the $i^{th}$ subcarrier spacing is increased by Yi compared with a reference quantity of channel estimation CCEs that corresponds to the $i^{th}$ subcarrier spacing, where $1 \leq i \leq 4$, Y1 is an integer not equal to 0, Y2 to Y4 are integers greater than or equal to 0, and the following conditions are satisfied: $Y1 \geq Y2 \geq Y3 \geq Y4$, and at least one of Y1 to Y4 is not equal to a maximum quantity of channel estimation CCEs that corresponds to a corresponding subcarrier spacing.

In an optional implementation, the time unit is a half slot.

In an optional implementation, when N is equal to 4, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, where $1 \leq i \leq 4$, W1 is greater than 1, W2, W3, and W4 are greater than or equal to 1, and W1 to W4 satisfy the following condition: $W1 \geq W2 \geq W3 \geq W4$; or when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, where $1 \leq i \leq 4$, Z1 is an integer greater than 0, Z2 to Z4 are integers greater than or equal to 0, and the following condition is satisfied: $Z1 \geq Z2 \geq Z3 \geq Z4$.

In an optional implementation, when N is equal to 4, in ascending order of the N subcarrier spacings, a maximum quantity of channel estimation CCEs that corresponds to the $i^{th}$ subcarrier spacing is Xi times a reference quantity of channel estimation CCEs that corresponds to the $i^{th}$ subcarrier spacing, where $1 \leq i \leq 4$, X1 is greater than 1, X2 to X4 are greater than or equal to 1, and the following condition is satisfied: $X1 \geq X2 \geq X3 \geq X4$; or when N is equal to 4, in ascending order of the N subcarrier spacings, a maximum quantity of channel estimation CCEs that corresponds to the $i^{th}$ subcarrier spacing is increased by Yi compared with a reference quantity of channel estimation CCEs that corresponds to the $i^{th}$ subcarrier spacing, where $1 \leq i \leq 4$, Y1 is an integer not equal to 0, Y2 to Y4 are integers greater than or equal to 0, and the following condition is satisfied: $Y1 \geq Y2 \geq Y3 \geq Y4$.

In an optional implementation, for the $i^{th}$ subcarrier spacing, Zi and Yi satisfy $Zi \leq Yi \leq p \times Zi$, where p is greater than 1 and less than or equal to 16.

In an optional implementation, when N is equal to 4, in ascending order of the N subcarrier spacings, a maximum quantity of blind detection times that corresponds to the $i^{th}$ subcarrier spacing is 1/Wi of a reference quantity of blind detection times that corresponds to the $i^{th}$ subcarrier spacing, where $1 \leq i \leq 4$, W1, W2, and W3 are greater than or equal to 1, W4 is greater than 1, and W1 to W4 satisfy the following condition: $W1 \leq W2 \leq W3 \leq W4 \leq 2$; or when N is equal to 4, in ascending order of the N subcarrier spacings, a maximum quantity of blind detection times that corresponds to the $i^{th}$ subcarrier spacing is decreased by Zi compared with a reference quantity of blind detection times that corresponds to the $i^{th}$ subcarrier spacing, where $1 \leq i \leq 4$, Z1 to Z3 are integers greater than or equal to 0, Z4 is an integer greater than 0, and the following conditions are satisfied: $Z1 \leq Z2 \leq Z3 \leq Z4$, and $Zi < Z_B i/2$, where $Z_B i$ is the reference quantity of blind detection times that corresponds to the $i^{th}$ subcarrier spacing.

In an optional implementation, when N is equal to 4, in ascending order of the N subcarrier spacings, a maximum quantity of channel estimation CCEs that corresponds to the $i^{th}$ subcarrier spacing is 1/Xi of a reference quantity of channel estimation CCEs that corresponds to the $i^{th}$ subcarrier spacing, where $1 \leq i \leq 4$, X1, X2, and X3 are greater than or equal to 1, X4 is greater than 1, and X1 to X4 satisfy the following condition: $X1 \leq X2 \leq X3 \leq X4 \leq 2$; or when N is equal to 4, in ascending order of the N subcarrier spacings, a maximum quantity of channel estimation CCEs that corresponds to the $i^{th}$ subcarrier spacing is decreased by Yi compared with a reference quantity of channel estimation CCEs that corresponds to the $i^{th}$ subcarrier spacing, where $1 \leq i \leq 4$, Y1 to Y3 are integers greater than 0, Y4 is an integer not equal to 0, and the following conditions are satisfied: $Y1 \leq Y2 \leq Y3 \leq Y4$, and $Yi < Y_B i/2$, where $Y_B i$ is the reference quantity of channel estimation CCEs that corresponds to the $i^{th}$ subcarrier spacing.

In an optional implementation, the PDCCH configuration information includes at least one aggregation level and a quantity of candidate PDCCHs at each of the at least one aggregation level in a half slot.

In an optional implementation, the PDCCH configuration information includes a quantity b of symbols occupied by a control resource set and O start symbol locations of the control resource set, where $O>0$, and $b>0$. The quantity b of symbols occupied by the control resource set and the O start symbol locations are used to determine a time-domain symbol location occupied by each of O blind detection occasions, and each of the O blind detection occasions occupies b symbols.

In an optional implementation, the b symbols occupied by each of the O blind detection occasions do not cross two different time units, or do not cross a boundary of the time unit.

According to an eighth aspect, an embodiment provides a PDCCH blind detection apparatus. The apparatus has a function of implementing behaviors of the network device in the foregoing method implementations. The function may be implemented by hardware or may be implemented by executing corresponding software by hardware. The hardware or software includes one or more modules corresponding to the function, for example, includes a processing unit and a transceiver unit. The modules may be software and/or hardware and are respectively configured to implement the steps in the foregoing method.

According to a ninth aspect, an embodiment provides a PDCCH blind detection apparatus. For example, the apparatus may be a network device, a structure of the network device includes a communications interface and a processor, and the processor controls an operation used for determining PDCCH configuration information, and the like. The communications interface is configured to support the network device in performing an operation such as sending a PDCCH to a terminal device based on the PDCCH configuration information determined by the processing unit and a blind detection capability of the terminal device.

According to a tenth aspect, an embodiment provides a computer readable storage medium. The computer storage medium stores a computer readable instruction. When a computer reads and executes the computer readable instruction, the computer is enabled to perform the method according to any one of the seventh aspect or the possible implementations of the seventh aspect.

According to an eleventh aspect, an embodiment provides a computer program product. When a computer reads and executes the computer program product, the computer is enabled to perform the method according to any one of the seventh aspect or the possible implementations of the seventh aspect.

According to a twelfth aspect, an embodiment provides a chip. The chip is connected to a memory and is configured to read and execute a software program stored in the memory, to implement the method according to any one of the seventh aspect or the possible implementations of the seventh aspect.

According to a thirteenth aspect, an embodiment provides a communications system. The system includes the network device and the terminal device according to any one of the foregoing aspects.

DETAILED DESCRIPTION OF EMBODIMENTS

The following describes embodiments in detail with reference to accompanying drawings of the specification.

The embodiments may be applied to various mobile communications systems, for example, a new radio (NR) system, a global system for mobile communications (GSM) system, a code division multiple access (CDMA) system, a wideband code division multiple access (WCDMA) system, a general packet radio service (GPRS), a long term evolution (LTE) system, a long term evolution advanced (LTE-A) system, a universal mobile telecommunications system (UMTS), an evolved long term evolution (eLTE) system, and other communications systems such as a future communications system. A specific system is not limited herein.

"Crossing" in the embodiments may mean mapping, for example, may be mapping to different time units.

The term "expression form" in the embodiments may be a correspondence of a formula. For example, for $X1 \geq X2 \geq X3 \geq X4$, one of expression forms thereof is $X1 \geq X2 \geq X3 \geq X4$.

Figure 1:
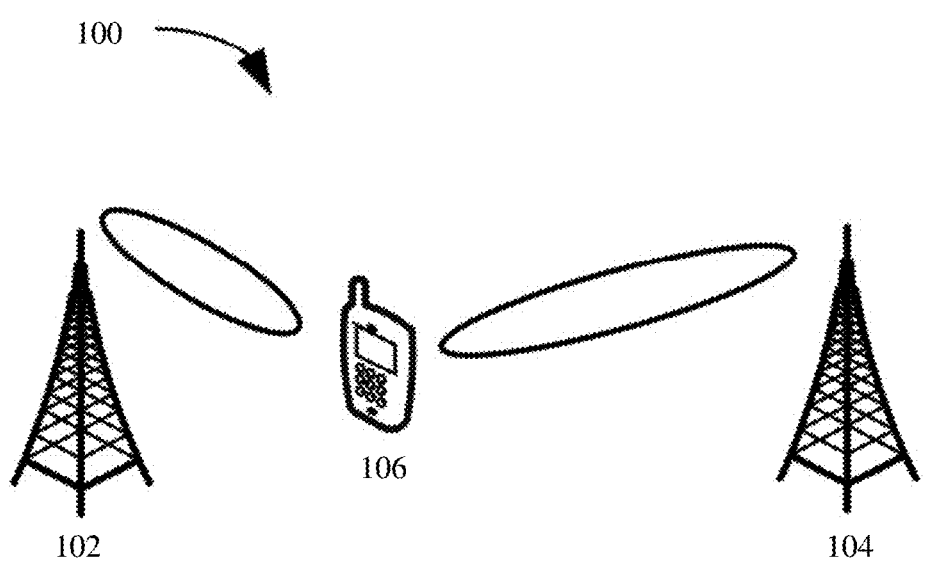
FIG. 1 is a schematic diagram of a communications system applicable to the embodiments.

For ease of understanding the embodiments, first, a communications system shown in FIG. 1 is used as an example to describe in detail a communications system applicable to the embodiments. FIG. 1 is a schematic diagram of the communications system applicable to a communication method in the embodiments. As shown in FIG. 1, the communications system 100 includes a network device 102 and a terminal device 106. The network device 102 may have a plurality of antennas, and the terminal device may also have a plurality of antennas. Optionally, the communications system may further include a network device 104, and the network device 104 may also have a plurality of antennas.

It can be understood that the network device 102 or the network device 104 may further include a plurality of components (for example, a processor, a modulator, a multiplexer, a demodulator, or a demultiplexer) related to signal sending and receiving.

In the embodiments, a terminal device is a device having a wireless transceiver function, or a chip that can be disposed in such a device. The device having the wireless transceiver function may also be referred to as user equipment (UE), an access terminal, a subscriber unit, a subscriber station, a mobile station, a remote station, a remote terminal, a mobile device, a user terminal, a user agent, or a user apparatus. In actual application, the terminal-side device in the embodiments may be a mobile phone, a tablet computer (or pad), a computer with a wireless transceiver function, a virtual reality (VR) terminal, an augmented reality (AR) terminal, a wireless terminal in industrial control, a wireless terminal in self-driving, a wireless terminal in telemedicine (or remote medical), a wireless terminal in a smart grid, a wireless terminal in transportation safety, a wireless terminal in a smart city, a wireless terminal in a smart home, or the like. A scenario is not limited in the embodiments.

In the embodiments, a network device may be a wireless access device in various standards, for example, an evolved NodeB (eNB), a radio network controller (RNC), a NodeB (NB), a base station controller (BSC), a base transceiver station (BTS), a home base station (for example, a home evolved NodeB, or a home NodeB, (HNB)), a baseband unit (BBU), an access point (AP) in a wireless fidelity (Wi-Fi) system, a wireless relay node, a wireless backhaul node, a transmission point (transmission and reception point (TRP) or transmission point (TP)), or a gNB, a transmission point (TRP or TP), or the like in a 5G (NR) system.

A network architecture and a service scenario that are described in the embodiments are used to describe technical solutions in the embodiments more clearly, and do not constitute a limitation on the technical solutions provided in the embodiments. A person of ordinary skill in the art may know that, with evolution of the network architecture and emergence of new service scenarios, the technical solutions provided in the embodiments are also applicable to similar technical issues.

Figure 2:
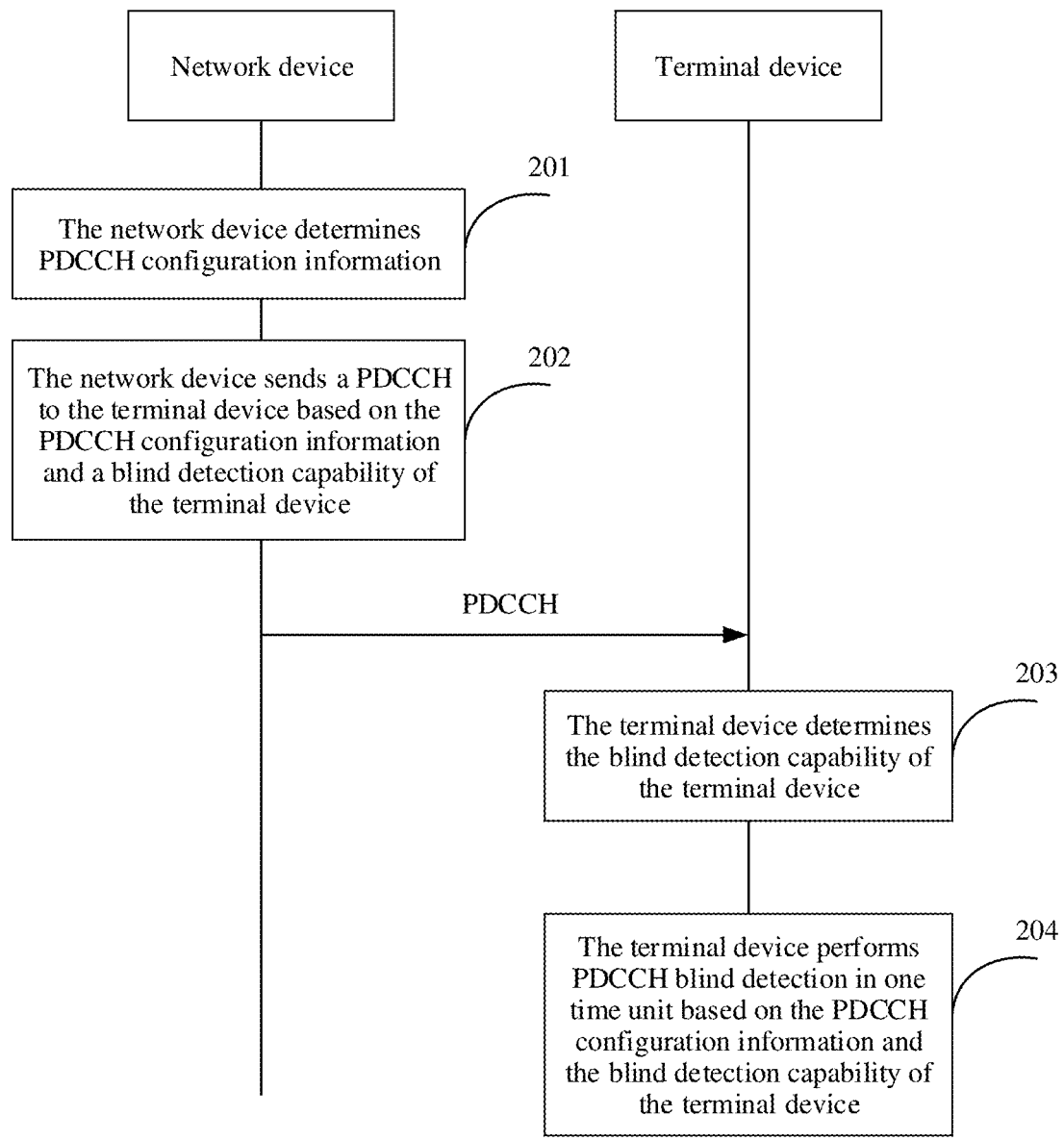
FIG. 2 is a schematic diagram of a PDCCH sending and blind detection method according to an embodiment.

FIG. 2 is a schematic flowchart of a PDCCH sending and blind detection method according to an embodiment. The method includes the following steps.

Step 201: A network device determines PDCCH configuration information.

Step 202: The network device sends a PDCCH to a terminal device based on the PDCCH configuration information and a blind detection capability of the terminal device.

Step 203: The terminal device determines the blind detection capability of the terminal device.

Step 204: The terminal device performs PDCCH blind detection in one time unit based on the PDCCH configuration information and the blind detection capability of the terminal device.

It may be noted that step 202 and step 203 are not performed in a particular order. In the method, step 203 may be alternatively performed before step 202. This is not limited in the embodiments.

The blind detection capability of the terminal device includes at least one of the following: N maximum quantities of blind detection times corresponding to N subcarrier spacings in the time unit and/or N maximum quantities of channel estimation control channel elements (CCE) corresponding to the N subcarrier spacings in the time unit, where N is a positive integer.

The blind detection capability of the terminal device satisfies at least one of the following conditions:

1. For one of the N subcarrier spacings, a first ratio is greater than a second ratio, and for a subcarrier spacing other than the one subcarrier spacing in the N subcarrier spacings, a first ratio is not less than a second ratio.

2. For the one subcarrier spacing, a third ratio is greater than a fourth ratio, and for the subcarrier spacing other than the one subcarrier spacing in the N subcarrier spacings, a third ratio is not less than a fourth ratio.

The first ratio is a ratio of a maximum quantity of blind detection times that corresponds to the subcarrier spacing to a quantity of symbols included in the time unit. The second ratio is a ratio of a reference quantity of blind detection times that corresponds to the subcarrier spacing to a quantity of symbols included in one slot. The third ratio is a ratio of a maximum quantity of channel estimation CCEs that corresponds to the subcarrier spacing to the quantity of symbols included in the time unit. The fourth ratio is a ratio of a reference quantity of channel estimation CCEs that corresponds to the subcarrier spacing to the quantity of symbols included in one slot.

In step 201 and step 203, the PDCCH configuration information includes one or more of the following:

1. Quantity b of symbols occupied by a control resource set (control resource set, CORESET) and O start symbol locations of the control resource set: O>0, O is a positive integer, and a specific value of O may be determined based on an actual situation.

The quantity b of symbols occupied by the control resource set and the O start symbol locations are used to determine a time-domain symbol location occupied by each of the O blind detection occasions, and each of the O blind detection occasions occupies b symbols, where b is an integer greater than 0. For example, if the control resource set occupies three symbols, and two start symbol locations of the control resource set are the first symbol and the seventh symbol, then b=3, and O=2. In addition, start symbol locations of the two blind detection occasions are the first symbol and the seventh symbol, and each blind detection occasion occupies three symbols in time domain. In other words, the first blind detection occasion is the first to the third symbols, and the second blind detection occasion is the seventh to the ninth symbols.

Optionally, in this embodiment, the b symbols occupied by each of the O blind detection occasions do not cross two different time units, or do not cross a boundary of the time unit. In other words, the b symbols occupied by each of the O blind detection occasions are not mapped to two different time units, that is, each blind detection occasion is in one time unit. A user does not expect to receive configuration information indicating that b symbols occupied by a blind detection occasion are in different time units.

For example, the time unit may be a half slot, that is, seven symbols. In this case, if the control resource set occupies three symbols, and two start symbol locations of the control resource set are the second symbol and the sixth symbol, then b=3, and O=2. In addition, start symbols of the two blind detection occasions are the second symbol and the sixth symbol. Therefore, each blind detection occasion occupies three symbols in time domain. In other words, the first blind detection occasion is the second to the fourth symbols, and the second blind detection occasion is the sixth to the eighth symbols. For example, the second blind detection occasion actually crosses a boundary of the half slot, that is, the second blind detection occasion crosses two different time units. As a result, a time unit corresponding to a quantity of candidate PDCCHs on the blind detection occasion is unclear. This is a case that is not expected by the user, which may also be understood as that the network device actually does not configure the quantity b of symbols occupied by the control resource set and the O start symbol locations of the control resource set in such a manner as to cause a case of cross-boundary.

2. Period, offset, and pattern of a PDCCH search space: the search space is associated with the control resource set; the period is measured in time units, for example, may be two time units; the offset is used to instruct to perform blind detection in one time unit in each period of the search space; and the pattern is used to indicate a start symbol location of the control resource set in the time unit in which blind detection needs to be performed.

It may be noted that one time unit may be one or more slots, may be one or more subframes, may be one or more half slots, or may include T symbols, where T is an integer greater than 0 and less than 14.

Further, in this embodiment, the pattern may be a 14-bit bitmap, or may be a 7-bit bitmap.

It may be noted that the search space may include two types: a common search space (CSS) and a user-specific search space (UE specific common search space, USS).

3. At least one aggregation level (AL): a time-frequency resource occupied by a PDCCH includes one or more CCEs. The CCE is a minimum unit for constituting the PDCCH. The PDCCH may be formed by aggregating H CCEs. H is referred to as an aggregation level. For example, if the PDCCH is formed by aggregating eight CCEs, the aggregation level is 8. For example, the PDCCH configuration information may include aggregation levels 1, 2, and 4, or may include aggregation levels 4, 8, and 16. There may be one aggregation level, two aggregation levels, or more than two aggregation levels. A specific quantity of aggregation levels is configured based on an actual situation. Details are not described herein.

4. Quantity of candidate PDCCHs: the quantity of candidate PDCCHs may include one or more of the following:
 a quantity of candidate PDCCHs at each of the at least one aggregation level in a half slot;
 a first quantity of candidate PDCCHs at each of the at least one aggregation level on one blind detection occasion;
 a first quantity of candidate PDCCHs at each of the at least one aggregation level in one slot; and
 a first quantity of candidate PDCCHs at each of the at least one aggregation level in one time unit.

For example, the aggregation level is 2, and a quantity of candidate PDCCHs in one slot is 2. In this case, in one slot, the terminal device needs to perform blind detection on a maximum of two candidate PDCCHs at the aggregation level 2.

The foregoing is merely an example. The PDCCH configuration information may further include other information, and examples are not listed one by one herein for description.

Figure 3:
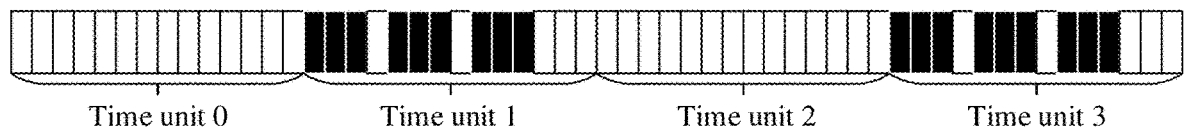
FIG. 3 is a schematic diagram of blind detection according to an embodiment.

For example, one time unit includes 14 symbols, the control resource set of the PDCCH indicates that the PDCCH occupies three symbols, the period of the search space is two time units, the offset of the search space is 2, and the bitmap of the pattern is 10001000100000, indicating that a symbol occupied by the control resource set is located in the second time unit in every two time units, and a symbol corresponding to a bit whose value is 1 in the pattern is a start symbol location of the control resource set. The terminal device starts blind detection from the start symbol location of the control resource set and performs blind detection continuously on three symbols. The start symbol location of the control resource set corresponds to one blind detection occasion. The blind detection occasion may be shown in FIG. 3.

The network device may send the PDCCH configuration information to the terminal device by using higher layer signaling. The higher layer signaling may be signaling sent from a higher-layer protocol layer. The higher-layer protocol layer is at least one protocol layer above a physical layer. The higher-layer protocol layer may specifically include at least one of the following protocol layers: a media access control (MAC) layer, a radio link control (RLC) layer, a packet data convergence protocol (PDCP) layer, a radio resource control (RRC) layer, and a non-access stratum (NAS).

In step 202, the network device needs to determine, based on the PDCCH configuration information, a quantity of blind detection times and a quantity of channel estimation CCEs of the terminal device in one time unit, and then sends at least one PDCCH with reference to the blind detection capability of the terminal device. For how to determine the quantity of blind detection times and the quantity of channel estimation CCEs of the terminal device in one time unit, refer to descriptions in step 204. Details are not described herein again. How the network device specifically sends the PDCCH is not limited in this embodiment, and details are not described herein.

In step 203, the blind detection capability of the terminal device may be defined in a mobile communications protocol or may be reported by the terminal device to the network device.

The blind detection capability of the terminal device includes at least one of the following: the N maximum quantities of blind detection times corresponding to the N subcarrier spacings in the time unit and/or the N maximum quantities of channel estimation CCE corresponding to the N subcarrier spacings in the time unit. Descriptions are as follows:

A quantity of blind detection times is a quantity of candidate PDCCHs for blind detection. For example, if a quantity of candidate PDCCHs is configured as 3 for an aggregation level 2, and one downlink control information (DCI) format or size (payload) needs to be detected for each candidate PDCCH, a quantity of blind detection times at the aggregation level 2 is 3*1=3. For example, a maximum quantity of blind detection times is a maximum quantity of blind detection times that the terminal device can bear in one time unit.

Quantity of channel estimation CCEs: when performing blind detection on a candidate PDCCH at an aggregation level, the terminal device needs to perform channel estimation before performing PDCCH decoding. Assuming that the aggregation level is 2, a quantity of CCEs on which channel estimation needs to be performed is 2. For example, a maximum quantity of channel estimation CCEs is a maximum value of a maximum quantity of CCEs on which the terminal device can perform channel estimation in one time unit.

The foregoing reference quantity of blind detection times is a maximum quantity of blind detection times of the terminal device in one slot for different subcarrier spacings, defined in a 3GPP mobile communications protocol (for example, 38.213), as shown in Table 1-1.

TABLE 1-1

| Subcarrier spacing | Reference quantity of blind detection times |
|---|---|
| 15 kHz | 44 |
| 30 kHz | 36 |
| 60 kHz | 22 |
| 120 kHz | 20 |

The reference quantity of channel estimation CCEs is a maximum quantity of channel estimation CCEs of the terminal device in one slot for different subcarrier spacings, defined in the 3GPP mobile communications protocol, as shown in Table 1-2.

TABLE 1-2

| Subcarrier spacing | Reference quantity of channel estimation CCEs |
|---|---|
| 15 kHz | 56 |
| 30 kHz | 56 |
| 60 kHz | 48 |
| 120 kHz | 32 |

For example, when one time unit is one slot, the blind detection capability of the terminal device includes four maximum quantities, of blind detection times, corresponding to four subcarrier spacings in one slot, as shown in Table 2-1.

TABLE 2-1

| Subcarrier spacing | Reference quantity of blind detection times |
|---|---|
| 15 kHz | V1 |
| 30 kHz | V2 |
| 60 kHz | V3 |
| 120 kHz | V4 |

For example, a first ratio corresponding to one of the N subcarrier spacings is a ratio of a maximum quantity Vi of blind detection times that corresponds to the $i^{th}$ subcarrier spacing in the four subcarrier spacings to a quantity 14 of symbols included in one slot. In this case, a first ratio corresponding to the subcarrier spacing 15 kHz is V1/14, and a first ratio corresponding to the subcarrier spacing 60 kHz is V3/14. First ratios corresponding to the other subcarrier spacings are deduced by analogy, and details are not described. A second ratio is a ratio of a reference quantity of blind detection times to the quantity 14 of symbols included in one slot. A second ratio corresponding to the subcarrier spacing 15 kHz is 44/14, and a second ratio corresponding to the subcarrier spacing 60 kHz is 22/14. Second ratios corresponding to the other subcarrier spacings are deduced by analogy, and details are not described.

For example, "for one of the N subcarrier spacings, a first ratio is greater than a second ratio, and for a subcarrier spacing other than the one subcarrier spacing in the N subcarrier spacings, a first ratio is not less than a second ratio" means that a first ratio corresponding to one of the four subcarrier spacings is greater than a second ratio corresponding to the one subcarrier spacing, and a first ratio corresponding to each of the remaining subcarrier spacings is greater than or equal to a second ratio corresponding to the subcarrier spacing. For example, the first ratio corresponding to the subcarrier spacing 15 kHz is greater than the second ratio corresponding to the subcarrier spacing 15 kHz, and first ratios corresponding to the remaining subcarrier spacings are respectively greater than or equal to second ratios corresponding to the remaining subcarrier spacings. In other words, (V1/14) is greater than (44/14), (V2/14) is greater than or equal to (36/14), (V3/14) is greater than or equal to (22/14), and (V4/14) is greater than or equal to (32/14). It can be understood from this relationship that, when the time unit is one slot, "for one of the N subcarrier spacings, a first ratio is greater than a second ratio, and for a subcarrier spacing other than the one subcarrier spacing in the N subcarrier spacings, a first ratio is not less than a second ratio" means that a maximum quantity of blind detection times that corresponds to one of the N subcarrier spacings is greater than a reference quantity of blind detection times that corresponds to the one subcarrier spacing, and a maximum quantity of blind detection times that corresponds to a subcarrier spacing other than the one subcarrier spacing in the N subcarrier spacings is not less than a reference quantity of blind detection times that corresponds to the subcarrier spacing.

Likewise, when the blind detection capability of the terminal device includes four maximum quantities of channel estimation CCEs corresponding to four subcarrier spacings in one slot, a method is similar, and details are not described.

For example, when one time unit is a half slot, the blind detection capability of the terminal device includes four maximum quantities, of blind detection times, corresponding to four subcarrier spacings in a half slot, as shown in Table 2-2.

TABLE 2-2

| Subcarrier spacing | Reference quantity of blind detection times |
|---|---|
| 15 kHz | V1 |
| 30 kHz | V2 |
| 60 kHz | V3 |
| 120 kHz | V4 |

For example, a first ratio corresponding to one of the N subcarrier spacings is a ratio of a maximum quantity Vi of blind detection times that corresponds to the $i^{th}$ subcarrier spacing in the four subcarrier spacings to a quantity 7 of symbols included in a half slot. In this case, a first ratio corresponding to the subcarrier spacing 15 kHz is V1/7, and a first ratio corresponding to the subcarrier spacing 60 kHz is V3/7. First ratios corresponding to the other subcarrier spacings are deduced by analogy, and details are not described. A second ratio is a ratio of a reference quantity of blind detection times to a quantity 14 of symbols included in one slot. A second ratio corresponding to the subcarrier spacing 15 kHz is 44/14, and a second ratio corresponding to the subcarrier spacing 60 kHz is 22/14. Second ratios corresponding to the other subcarrier spacings are deduced by analogy, and details are not described.

For example, "for one of the N subcarrier spacings, a first ratio is greater than a second ratio, and for a subcarrier spacing other than the one subcarrier spacing in the N subcarrier spacings, a first ratio is not less than a second ratio" means that a first ratio corresponding to one of the four subcarrier spacings is greater than a second ratio corresponding to the one subcarrier spacing, and a first ratio corresponding to each of the remaining subcarrier spacings is greater than or equal to a second ratio corresponding to the subcarrier spacing. For example, the first ratio corresponding to the subcarrier spacing 15 kHz is greater than the second ratio corresponding to the subcarrier spacing 15 kHz, and first ratios corresponding to the remaining subcarrier spacings are respectively greater than or equal to second ratios corresponding to the remaining subcarrier spacings. In other words, (V1/7) is greater than (44/14), (V2/7) is greater than or equal to (36/14), (V3/7) is greater than or equal to (22/14), and (V4/7) is greater than or equal to (32/14). It can be understood from this relationship that, when the time unit is a half slot, "for one of the N subcarrier spacings, a first ratio is greater than a second ratio, and for a subcarrier spacing other than the one subcarrier spacing in the N subcarrier spacings, a first ratio is not less than a second ratio" means that a maximum quantity of blind detection times that corresponds to one of the N subcarrier spacings in one slot (namely, twice that in a half slot) is greater than a reference quantity of blind detection times that corresponds to the one subcarrier spacing, and a maximum quantity of blind detection times that corresponds to a subcarrier spacing other than the one subcarrier spacing in the N subcarrier spacings in one slot (namely, twice that in a half slot) is not less than a reference quantity of blind detection times that corresponds to the subcarrier spacing.

Likewise, when the blind detection capability of the terminal device includes four maximum quantities of channel estimation CCEs corresponding to four subcarrier spacings in a half slot, a method is similar, and details are not described.

Descriptions for a case in which a length of a first time unit is T symbols are similar to descriptions for a case in which one time unit is a half slot, and details are not described.

To sum up, in Table 1-1 and Table 1-2, a reference blind detection capability, of a terminal, defined in the existing mobile communications protocol can satisfy a requirement of a general service. However, because a limitation on a reference quantity of channel estimation CCEs is relatively strict, that is, a value is relatively small, a quantity of CCEs occupied by a PDCCH that can be scheduled in one slot is limited, in other words, an aggregation level of the PDCCH is limited. Therefore, a time-frequency resource occupied by the PDCCH is also limited. Consequently, a data transmission reliability requirement of a URLLC service cannot be satisfied. In addition, because a limitation on a reference quantity of blind detection times is also relatively strict, that is, a value is relatively small, a quantity of PDCCHs on which blind detection can be performed in one slot is limited, that is, a scheduling opportunity of a PDCCH is limited. Consequently, a latency requirement of a URLLC service cannot be satisfied. With reference to the blind detection capability determined by the terminal device in this embodiment, the terminal device increases a quantity of blind detection times in one time unit, thereby increasing a quantity of scheduling opportunities in one time unit, and reducing a URLLC service latency; and the terminal device increases a quantity of channel estimation CCEs in one time unit, so that the terminal device increases a quantity of time-frequency resources that can be occupied by a PDCCH in one time unit, thereby improving URLLC service reliability.

In this embodiment, there are a plurality of implementations of the blind detection capability of the terminal device during specific implementation. The following describes the implementations in detail. It may be noted that, in the following descriptions, an example in which N is 4 is used for description. When N is another value, refer to the following descriptions. The value of N is merely an example for understanding the technical solutions. This is not repeated.

In this embodiment, when one time unit is one slot, there may be a first possible implementation, a second possible implementation, or a third possible implementation. Descriptions are as follows:

First possible implementation: the blind detection capability of the terminal device includes the N maximum quantities of blind detection times corresponding to the N subcarrier spacings in the time unit. For one of the N subcarrier spacings, a first ratio is greater than a second ratio, and for a subcarrier spacing other than the one subcarrier spacing in the N subcarrier spacings, a first ratio is not less than a second ratio. In other words, a maximum quantity of blind detection times that corresponds to at least one subcarrier spacing of the terminal device in the time unit is increased relative to a reference value, and a maximum quantity of blind detection times that corresponds to a remaining subcarrier spacing in the time unit is not decreased relative to a reference value.

In this scenario, in ascending order of the N subcarrier spacings, a maximum quantity of blind detection times that corresponds to the $i^{th}$ subcarrier spacing may be Wi times a reference quantity of blind detection times that corresponds to the $i^{th}$ subcarrier spacing, where $1 \le i \le 4$, W1 is greater than 1, W2, W3, and W4 are greater than or equal to 1, and the following conditions are satisfied:

W1≥W2≥W3≥W4, and at least one of W1 to W4 is not equal to 2.

With reference to Table 1-1, in this implementation, a quantity of blind detection times of the terminal device in one time unit may be shown in Table 3-1.

TABLE 3-1

| Subcarrier spacing | Quantity of blind detection times |
|---|---|
| 15 kHz | 44 × W1 |
| 30 kHz | 36 × W2 |
| 60 kHz | 22 × W3 |
| 120 kHz | 20 × W4 |

Compared with Table 1-1, in Table 3-1, a quantity of blind detection times of the terminal device in one time unit is correspondingly increased, so that a quantity of opportunities of scheduling a URLLC service for the terminal device in one time unit is increased, thereby reducing a URLLC service latency for the terminal device.

It can be noted that the condition that W1≥W2≥W3≥W4 and at least one of W1 to W4 is not equal to 2 is merely a possible implementation. W1 to W4 may alternatively satisfy any one of the following conditions:

$W1 > W2 \ge W3 \ge W4$; or $W1 \ge W2 > W3 \ge W4$; or $W1 \ge W2 \ge W3 > W4$; or $W1 > W2 > W3 > W4$.

It can be noted that, in all the embodiments, "≥" represents "greater than or equal to". The foregoing condition may include:

W1>W2≥W3≥W4, that is, W1 is greater than W2, W2 is greater than or equal to W3, and W3 is greater than or equal to W4.

For example, a quantity of blind detection times of the terminal device in one time unit may be shown in Table 3-2.

TABLE 3-2

| Subcarrier spacing | Quantity of blind detection times |
|---|---|
| 15 kHz | 88 |
| 30 kHz | 72 |
| 60 kHz | 22 |
| 120 kHz | 20 |

This is equivalent to the following: W1=2, W2=2, W3=1, W4=1, and at least one of W1 to W4 is not equal to 2. In other words, this satisfies one of expression forms of W1≥W2≥W3≥W4.

For example, a quantity of blind detection times of the terminal device in one time unit may be shown in Table 3-3.

TABLE 3-3

| Subcarrier spacing | Quantity of blind detection times |
|---|---|
| 15 kHz | 88 |
| 30 kHz | 36 |
| 60 kHz | 22 |
| 120 kHz | 20 |

This is equivalent to the following: W1=2, W2=1, W3=1, W4=1, and at least one of W1 to W4 is not equal to 2. In other words, this satisfies one of expression forms of W1≥W2≥W3≥W4.

For example, a quantity of blind detection times of the terminal device in one time unit may be shown in Table 3-4.

TABLE 3-4

| Subcarrier spacing | Quantity of blind detection times |
|---|---|
| 15 kHz | 88 |
| 30 kHz | 72 |
| 60 kHz | 44 |
| 120 kHz | 20 |

For example, W1=2, W2=2, W3=2, W4=1, and at least one of W1 to W4 is not equal to 2. In other words, this satisfies one of expression forms of W1≥W2≥W3≥W4.

For example, a quantity of blind detection times of the terminal device in one time unit may be shown in Table 3-5.

TABLE 3-5

| Subcarrier spacing | Quantity of blind detection times |
|---|---|
| 15 kHz | 84 |
| 30 kHz | 72 |
| 60 kHz | 22 |
| 120 kHz | 20 |

For example, W1=1.9, W2=2, W3=1, W4=1, and at least one of W1 to W4 is not equal to 2. In other words, this satisfies one of expression forms of W1≥W2≥W3≥W4.

In another equivalent implementation, in ascending order of the N subcarrier spacings, a maximum quantity of blind detection times that corresponds to the $i^{th}$ subcarrier spacing may be increased by Zi compared with a reference quantity of blind detection times that corresponds to the $i^{th}$ subcarrier spacing, where $1 \le i \le 4$, Z1 is an integer greater than 0, Z2, Z3, and Z4 are integers greater than or equal to 0, and the following conditions are satisfied:

Z1≥Z2≥Z3≥Z4, and at least one of Z1 to Z4 is not equal to a reference quantity of blind detection times that corresponds to a corresponding subcarrier spacing.

With reference to Table 1-1, in this implementation, a quantity of blind detection times of the terminal device in one time unit may be shown in Table 4-1.

TABLE 4-1

| Subcarrier spacing | Quantity of blind detection times |
|---|---|
| 15 kHz | 44 + Z1 |
| 30 kHz | 36 + Z2 |
| 60 kHz | 22 + Z3 |
| 120 kHz | 20 + Z4 |

It can be noted that $Z1 \geq Z2 \geq Z3 \geq Z4$ is merely a possible implementation. Z1 to Z4 may alternatively satisfy any one of the following conditions:

$Z1=Z2 \geq Z3 \geq Z4$; or $Z1=Z2=Z3 \geq Z4$; or $Z1 \geq Z2 \geq Z3=Z4$.

It can be noted that the foregoing implementations do not include any one of the following cases:

$Z1=16, Z2=8, Z3=8$, and $Z4=0$; or $Z1 \leq 16, Z2=Z3 \leq 8$, and $Z4=0$.

For example, a quantity of blind detection times of the terminal device in one time unit may be shown in Table 4-2.

TABLE 4-2

| Subcarrier spacing | Quantity of blind detection times |
| --- | --- |
| 15 kHz | 88 |
| 30 kHz | 72 |
| 60 kHz | 22 |
| 120 kHz | 20 |

For example, $Z1=44$, $Z2=36$, $Z3=0$, $Z4=0$, and at least one of Z1 to Z4 is not equal to a reference quantity of blind detection times that corresponds to a corresponding subcarrier spacing. In other words, this satisfies one of expression forms of $Z1 \geq Z2 \geq Z3 \geq Z4$.

For example, a quantity of blind detection times of the terminal device in one time unit may be shown in Table 4-3.

TABLE 4-3

| Subcarrier spacing | Quantity of blind detection times |
| --- | --- |
| 15 kHz | 88 |
| 30 kHz | 36 |
| 60 kHz | 22 |
| 120 kHz | 20 |

For example, $Z1=44$, $Z2=36$, $Z3=0$, $Z4=0$, and at least one of Z1 to Z4 is not equal to a reference quantity of blind detection times that corresponds to a corresponding subcarrier spacing. In other words, this satisfies one of expression forms of $Z1 \geq Z2 \geq Z3 \geq Z4$.

For example, a quantity of blind detection times of the terminal device in one time unit may be shown in Table 4-4.

TABLE 4-4

| Subcarrier spacing | Quantity of blind detection times |
| --- | --- |
| 15 kHz | 88 |
| 30 kHz | 72 |
| 60 kHz | 44 |
| 120 kHz | 20 |

For example, $Z1=44$, $Z2=36$, $Z3=22$, $Z4=0$, and at least one of Z1 to Z4 is not equal to a reference quantity of blind detection times that corresponds to a corresponding subcarrier spacing. In other words, this satisfies one of expression forms of $Z1 \geq Z2 \geq Z3 \geq Z4$.

For example, a quantity of blind detection times of the terminal device in one time unit may be shown in Table 4-5.

TABLE 4-5

| Subcarrier spacing | Quantity of blind detection times |
| --- | --- |
| 15 kHz | 84 |
| 30 kHz | 72 |
| 60 kHz | 22 |
| 120 kHz | 20 |

This is equivalent to the following: $Z1=42$, $Z2=36$, $Z3=0$, $Z4=0$, and at least one of Z1 to Z4 is not equal to a reference quantity of blind detection times that corresponds to a corresponding subcarrier spacing. In other words, this satisfies one of expression forms of $Z1 \geq Z2 \geq Z3 \geq Z4$.

Second possible implementation: the blind detection capability of the terminal device includes the N maximum quantities of channel estimation CCEs corresponding to the N subcarrier spacings in the time unit. For the one subcarrier spacing, a third ratio is greater than a fourth ratio, and for the subcarrier spacing other than the one subcarrier spacing in the N subcarrier spacings, a third ratio is not less than a fourth ratio. In other words, a maximum quantity of channel estimation CCEs that corresponds to at least one subcarrier spacing of the terminal device in the time unit is increased relative to a reference quantity of channel estimation CCEs, and a maximum quantity of channel estimation CCEs that corresponds to a remaining subcarrier spacing in the first time unit is not decreased relative to a reference quantity of channel estimation CCEs.

In this scenario, in ascending order of the N subcarrier spacings, a maximum quantity of channel estimation CCEs that corresponds to the $i^{th}$ subcarrier spacing is Xi times a reference quantity of channel estimation CCEs that corresponds to the $i^{th}$ subcarrier spacing, where $1 \leq i \leq 4$, X1 is greater than 1, X2 to X4 are greater than or equal to 1, and the following conditions are satisfied:

$X1 \geq X2 \geq X3 \geq X4$, and at least one of X1 to X4 is not equal to 2.

It can be noted that, in all the embodiments, "$\geq$" represents "greater than or equal to", and "$\leq$" represents "less than or equal to". This is not repeated in the following.

Therefore, the foregoing condition may include:

$X1 \geq X2 \geq X3 \geq X4$, that is, X1 is greater than X2, X2 is greater than or equal to X3, and X3 is greater than or equal to X4.

With reference to Table 1-2, in this implementation, a quantity of channel estimation CCEs of the terminal device in one time unit may be shown in Table 5-1.

TABLE 5-1

| Subcarrier spacing | Quantity of channel estimation CCEs |
| --- | --- |
| 15 kHz | 56 × X1 |
| 30 kHz | 56 × X2 |
| 60 kHz | 48 × X3 |
| 120 kHz | 32 × X4 |

Compared with Table 1-2, in Table 5-1, a quantity of channel estimation CCEs of the terminal device in one time unit is correspondingly increased, so that a quantity of CCEs constituting a PDCCH in one time unit is increased, thereby ensuring URLLC service reliability.

It can be noted that $X1 \geq X2 \geq X3 \geq X4$ and at least one of X1 to X4 is not equal to 2. Certainly, this is merely a possible implementation. X1 to X4 may alternatively satisfy any one of the following conditions:

$X1 > X2 \geq X3 \geq X4$; or $X1 \geq X2 > X3 \geq X4$; or $X1 \geq X2 \geq X3 > X4$; or $X1 > X2 > X3 > X4$.

For example, a quantity of channel estimation CCEs of the terminal device in one time unit may be shown in Table 5-2.

TABLE 5-2

| Subcarrier spacing | Quantity of channel estimation CCEs |
|---|---|
| 15 kHz | 112 |
| 30 kHz | 112 |
| 60 kHz | 48 |
| 120 kHz | 32 |

This is equivalent to the following: X1=2, X2=2, X3=1, X4=1, and at least one of X1 to X4 is not equal to 2. In other words, this satisfies one of expression forms of $X1 \geq X2 \geq X3 \geq X4$.

For example, a quantity of channel estimation CCEs of the terminal device in one time unit may be shown in Table 5-3.

TABLE 5-3

| Subcarrier spacing | Quantity of channel estimation CCEs |
|---|---|
| 15 kHz | 112 |
| 30 kHz | 56 |
| 60 kHz | 48 |
| 120 kHz | 32 |

For example, X1=2, X2=1, X3=1, X4=1, and at least one of X1 to X4 is not equal to 2. In other words, this satisfies one of expression forms of $X1 \geq X2 \geq X3 \geq X4$.

For example, a quantity of channel estimation CCEs of the terminal device in one time unit may be shown in Table 5-4.

TABLE 5-4

| Subcarrier spacing | Quantity of channel estimation CCEs |
|---|---|
| 15 kHz | 112 |
| 30 kHz | 112 |
| 60 kHz | 96 |
| 120 kHz | 32 |

This is equivalent to the following: X1=2, X2=2, X3=2, X4=1, and at least one of X1 to X4 is not equal to 2. In other words, this satisfies $X1 \geq X2 \geq X3 \geq X4$.

For example, a quantity of channel estimation CCEs of the terminal device in one time unit may be shown in Table 5-5.

TABLE 5-5

| Subcarrier spacing | Quantity of channel estimation CCEs |
|---|---|
| 15 kHz | 100 |
| 30 kHz | 100 |
| 60 kHz | 48 |
| 120 kHz | 32 |

This is equivalent to the following: X1=1.78, X2=1.78, X3=1, X4=1, and at least one of X1 to X4 is not equal to 2. In other words, this satisfies one of expression forms of $X1 \geq X2 \geq X3 \geq X4$.

In another equivalent implementation, in ascending order of the N subcarrier spacings, a maximum quantity of channel estimation CCEs that corresponds to the $i^{th}$ subcarrier spacing is increased by Yi compared with a reference quantity of channel estimation CCEs that corresponds to the $i^{th}$ subcarrier spacing, where $1 \leq i \leq 4$, Y1 is an integer not equal to 0, Y2 to Y4 are integers greater than or equal to 0, and the following conditions are satisfied:

$Y1 \geq Y2 \geq Y3 \geq Y4$, and at least one of Y1 to Y4 is not equal to a maximum quantity of channel estimation CCEs that corresponds to a corresponding subcarrier spacing.

With reference to Table 1-2, in this implementation, a quantity of channel estimation CCEs of the terminal device in one time unit may be shown in Table 6-1.

TABLE 6-1

| Subcarrier spacing | Quantity of channel estimation CCEs |
|---|---|
| 15 kHz | 56 + Y1 |
| 30 kHz | 56 + Y2 |
| 60 kHz | 48 + Y3 |
| 120 kHz | 32 + Y4 |

It can be noted that $Y1 \geq Y2 \geq Y3 \geq Y4$, and at least one of Y1 to Y4 is not equal to a maximum quantity of channel estimation CCEs that corresponds to a corresponding subcarrier spacing. This is merely a possible implementation. Y1 to Y4 may alternatively satisfy any one of the following conditions:

$Y1 = Y2 \geq Y3 \geq Y4$; or $Y1 \geq Y2 > Y3 \geq Y4$; or $Y1 \geq Y2 \geq Y3 = Y4$.

For example, a quantity of channel estimation CCEs of the terminal device in one time unit may be shown in Table 6-2.

TABLE 6-2

| Subcarrier spacing | Quantity of channel estimation CCEs |
|---|---|
| 15 kHz | 112 |
| 30 kHz | 112 |
| 60 kHz | 48 |
| 120 kHz | 32 |

For example, Y1=56, Y2=56, Y3=0, Y4=0, and at least one of Y1 to Y4 is not equal to a maximum quantity of channel estimation CCEs that corresponds to a corresponding subcarrier spacing. In other words, this satisfies one of expression forms of $Y1 \geq Y2 \geq Y3 \geq Y4$.

For example, a quantity of channel estimation CCEs of the terminal device in one time unit may be shown in Table 6-3.

TABLE 6-3

| Subcarrier spacing | Quantity of channel estimation CCEs |
| --- | --- |
| 15 kHz | 112 |
| 30 kHz | 56 |
| 60 kHz | 48 |
| 120 kHz | 32 |

For example, Y1=56, Y2=0, Y3=0, Y4=0, and at least one of Y1 to Y4 is not equal to a maximum quantity of channel estimation CCEs that corresponds to a corresponding subcarrier spacing. This satisfies one of expression forms of Y1≥Y2≥Y3≥Y4.

For example, a quantity of channel estimation CCEs of the terminal device in one time unit may be shown in Table 6-4.

TABLE 6-4

| Subcarrier spacing | Quantity of channel estimation CCEs |
| --- | --- |
| 15 kHz | 112 |
| 30 kHz | 112 |
| 60 kHz | 96 |
| 120 kHz | 32 |

For example, Y1=56, Y2=56, Y3=48, Y4=0, and at least one of Y1 to Y4 is not equal to a maximum quantity of channel estimation CCEs that corresponds to a corresponding subcarrier spacing. This satisfies one of expression forms of Y1≥Y2≥Y3≥Y4.

For example, a quantity of channel estimation CCEs of the terminal device in one time unit may be shown in Table 6-5.

TABLE 6-5

| Subcarrier spacing | Quantity of channel estimation CCEs |
| --- | --- |
| 15 kHz | 100 |
| 30 kHz | 100 |
| 60 kHz | 48 |
| 120 kHz | 32 |

For example, Y1=44, Y2=44, Y3=0, Y4=0, and at least one of Y1 to Y4 is not equal to a maximum quantity of channel estimation CCEs that corresponds to a corresponding subcarrier spacing. This satisfies one of expression forms of Y1≥Y2≥Y3≥Y4.

Third possible implementation: the blind detection capability of the terminal device includes the N maximum quantities of blind detection times corresponding to the N subcarrier spacings in the time unit. For one of the N subcarrier spacings, a first ratio is greater than a second ratio, and for a subcarrier spacing other than the one subcarrier spacing in the N subcarrier spacings, a first ratio is not less than a second ratio. In other words, a maximum quantity of blind detection times that corresponds to at least one subcarrier spacing of the terminal device in the time unit is increased relative to a reference value, and a maximum quantity of blind detection times that corresponds to a remaining subcarrier spacing in the time unit is not decreased relative to a reference value. The blind detection capability of the terminal device further includes the N maximum quantities, of channel estimation CCEs, corresponding to the N subcarrier spacings in the time unit. For the one subcarrier spacing, a third ratio is greater than a fourth ratio, and for the subcarrier spacing other than the one subcarrier spacing in the N subcarrier spacings, a third ratio is not less than a fourth ratio. In other words, a maximum quantity of channel estimation CCEs that corresponds to at least one subcarrier spacing of the terminal device in the time unit is increased relative to a reference quantity of channel estimation CCEs, and a maximum quantity of channel estimation CCEs that corresponds to a remaining subcarrier spacing in the first time unit is not decreased relative to a reference quantity of channel estimation CCEs.

For a condition satisfied after the quantity of blind detection times and the quantity of channel estimation CCEs are increased, refer to the first and the second possible implementations. Details are not described herein again.

Optionally, in the N subcarrier spacings, for the $i^{th}$ subcarrier spacing, Zi and Yi further satisfy the following condition:

$Zi \leq Yi \leq p \times Zi$, where p is greater than 1 and less than or equal to 16. For example, a value of p may be 12, 16, or 16/1.32. Examples are not listed one by one herein for description. The N subcarrier spacings in Table 4-1 or Table 6-1 may be the first to the fourth subcarrier spacings in descending order. A quantity Z1 by which the maximum quantity of blind detection times that corresponds to the first subcarrier spacing 15 kHz is increased compared with the reference quantity of blind detection times and a quantity Y1 by which the maximum quantity of channel estimation CCEs that corresponds to the subcarrier spacing is increased compared with the reference quantity of channel estimation CCEs satisfy $Z1 \leq Y1 \leq p \times Z1$.

In the foregoing method, Zi and Yi are further limited, so that an increase in a quantity of blind detection times and an increase in a quantity of channel estimation CCEs remain at a specific ratio. This avoids the following case: an increase in one of the quantities is excessively large whereas an increase in the other quantity is excessively small, resulting in mutual constraining between reliability and a latency of a URLLC service of the terminal device, and consequently, the reliability and latency of the URLLC service cannot be ensured at the same time.

In this embodiment, when a length of the time unit is a half slot, there may be any one of a fourth possible implementation to a sixth possible implementation.

Fourth possible implementation: the blind detection capability of the terminal device includes the N maximum quantities of blind detection times corresponding to the N subcarrier spacings in the time unit. For one of the N subcarrier spacings, a first ratio is greater than a second ratio, and for a subcarrier spacing other than the one subcarrier spacing in the N subcarrier spacings, a first ratio is not less than a second ratio. In other words, a maximum quantity of blind detection times that corresponds to at least one subcarrier spacing of the terminal device in the time unit is increased relative to a reference value, and a maximum quantity of blind detection times that corresponds to a remaining subcarrier spacing in the time unit is not decreased relative to a reference value.

In this scenario, in ascending order of the N subcarrier spacings, a maximum quantity of blind detection times that corresponds to the $i^{th}$ subcarrier spacing may be Wi times a reference quantity of blind detection times that corresponds to the $i^{th}$ subcarrier spacing, where $1 \leq i \leq 4$, W1 is greater than 1, W2, W3, and W4 are greater than or equal to 1, and the following condition is satisfied:

$$W1 \geq W2 \geq W3 \geq W4.$$

In this implementation, a quantity of blind detection times of the terminal device in one time unit may be shown in Table 7-1.

TABLE 7-1

| Subcarrier spacing | Quantity of blind detection times |
|---|---|
| 15 kHz | 44 × W1 |
| 30 kHz | 36 × W2 |
| 60 kHz | 22 × W3 |
| 120 kHz | 20 × W4 |

For example, a quantity of blind detection times of the terminal device in one time unit may be shown in Table 7-2.

TABLE 7-2

| Subcarrier spacing | Quantity of blind detection times |
|---|---|
| 15 kHz | 56 |
| 30 kHz | 44 |
| 60 kHz | 22 |
| 20 | 20 |

For example, W1=1.27, W2=1.22, W3=1, W1=1, W1 is greater than 1, and W2, W3, and W4 are greater than or equal to 1. This satisfies one of expression forms of W1≥W2≥W3≥W4.

In another equivalent implementation, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, where 1≤i≤4, Z1 is an integer greater than 0, Z2 to Z4 are integers greater than or equal to 0, and the following condition is satisfied:

Z1≥Z2≥Z3≥Z4.

In this implementation, a quantity of blind detection times of the terminal device in one time unit may be shown in Table 8-1.

TABLE 8-1

| Subcarrier spacing | Quantity of blind detection times |
|---|---|
| 15 kHz | 44 + Z1 |
| 30 kHz | 36 + Z2 |
| 60 kHz | 22 + Z3 |
| 120 kHz | 20 + Z4 |

In this implementation, one time unit is a half slot, which is half of a time unit length in an existing mobile communications protocol. A quantity of blind detection times of the terminal device in one time unit is correspondingly increased, so that a quantity of opportunities of scheduling a URLLC service for the terminal device in one time unit is increased, thereby reducing a URLLC service latency for the terminal device.

For example, a quantity of blind detection times of the terminal device in one time unit may be shown in Table 8-2.

TABLE 8-2

| Subcarrier spacing | Quantity of blind detection times |
|---|---|
| 15 kHz | 56 |
| 30 kHz | 44 |

TABLE 8-2-continued

| Subcarrier spacing | Quantity of blind detection times |
|---|---|
| 60 kHz | 22 |
| 20 | 20 |

For example, Z1=12, Z2=6, Z3=0, Z4=0, Z1 is an integer greater than 0, and Z2 to Z4 are integers greater than or equal to 0. This satisfies one of expression forms of Z1≥Z2≥Z3≥Z4.

Fifth possible implementation: the blind detection capability of the terminal device includes the N maximum quantities of channel estimation CCEs corresponding to the N subcarrier spacings in the time unit. For the one subcarrier spacing, a third ratio is greater than a fourth ratio, and for the subcarrier spacing other than the one subcarrier spacing in the N subcarrier spacings, a third ratio is not less than a fourth ratio. In other words, a maximum quantity of channel estimation CCEs that corresponds to at least one subcarrier spacing of the terminal device in the time unit is increased relative to a reference quantity of channel estimation CCEs, and a maximum quantity of channel estimation CCEs that corresponds to a remaining subcarrier spacing in the first time unit is not decreased relative to a reference quantity of channel estimation CCEs.

In this scenario, in ascending order of the N subcarrier spacings, a maximum quantity of channel estimation CCEs that corresponds to the $i^{th}$ subcarrier spacing is Xi times a reference quantity of channel estimation CCEs that corresponds to the $i^{th}$ subcarrier spacing, where 1≤i≤4, X1 is greater than 1, X2 to X4 are greater than or equal to 1, and the following condition is satisfied: X1≥X2≥X3≥X4.

In this implementation, a quantity of channel estimation CCEs of the terminal device in one time unit may be shown in Table 9-1.

TABLE 9-1

| Subcarrier spacing | Quantity of channel estimation CCEs |
|---|---|
| 15 kHz | 56 × X1 |
| 30 kHz | 56 × X2 |
| 60 kHz | 48 × X3 |
| 120 kHz | 32 × X4 |

For example, a quantity of channel estimation CCEs of the terminal device in one time unit may be shown in Table 9-2.

TABLE 9-2

| Subcarrier spacing | Quantity of channel estimation CCEs |
|---|---|
| 15 kHz | 72 |
| 30 kHz | 72 |
| 60 kHz | 48 |
| 120 kHz | 32 |

For example, X1=1.29, X2=1.29, X3=1, X4=1, and at least one of X1 to X4 is not equal to 2. In other words, this satisfies one of expression forms of X1≥X2≥X3≥X4.

In another equivalent implementation, in ascending order of the N subcarrier spacings, a maximum quantity of channel estimation CCEs that corresponds to the $i^{th}$ subcarrier spacing is increased by Yi compared with a reference quantity of channel estimation CCEs that corresponds to the $i^{th}$ subcarrier spacing, where 1≤i≤4, Y1 is an integer not equal to 0, Y2 to Y4 are integers greater than or equal to 0, and the following condition is satisfied: Y1≥Y2≥Y3≥Y4.

With reference to Table 1-2, in this implementation, a quantity of channel estimation CCEs of the terminal device in one time unit may be shown in Table 10-1.

TABLE 10-1

| Subcarrier spacing | Quantity of channel estimation CCEs |
|---|---|
| 15 kHz | 56 + Y1 |
| 30 kHz | 56 + Y2 |
| 60 kHz | 48 + Y3 |
| 120 kHz | 32 + Y4 |

For example, a quantity of channel estimation CCEs of the terminal device in one time unit may be shown in Table 10-2.

TABLE 10-2

| Subcarrier spacing | Quantity of channel estimation CCEs |
|---|---|
| 15 kHz | 72 |
| 30 kHz | 72 |
| 60 kHz | 48 |
| 120 kHz | 32 |

For example, Y1=1.29, Y1=1.29, Y3=1, Y4=1, Y1 is an integer not equal to 0, and Y2 to Y4 are integers greater than or equal to 0. In other words, this satisfies Y1≥Y2≥Y3≥Y4.

In this implementation, one time unit is a half slot, which is half of that in an existing mobile communications protocol. A quantity of channel estimation CCEs for channel estimation by the terminal device in one time unit is increased. This is equivalent to that a quantity of CCEs that can be used for PDCCH transmission in one time unit is increased. In other words, this is equivalent to that a quantity of resources occupied by a PDCCH is increased. Therefore, URLLC service reliability is improved.

Sixth possible implementation: the blind detection capability of the terminal device includes the N maximum quantities of blind detection times corresponding to the N subcarrier spacings in the time unit. For one of the N subcarrier spacings, a first ratio is greater than a second ratio, and for a subcarrier spacing other than the one subcarrier spacing in the N subcarrier spacings, a first ratio is not less than a second ratio. In other words, a maximum quantity of blind detection times that corresponds to at least one subcarrier spacing of the terminal device in the time unit is increased relative to a reference value, and a maximum quantity of blind detection times that corresponds to a remaining subcarrier spacing in the time unit is not decreased relative to a reference value. The blind detection capability of the terminal device further includes the N maximum quantities, of channel estimation CCEs, corresponding to the N subcarrier spacings in the time unit. For the one subcarrier spacing, a third ratio is greater than a fourth ratio, and for the subcarrier spacing other than the one subcarrier spacing in the N subcarrier spacings, a third ratio is not less than a fourth ratio. In other words, a maximum quantity of channel estimation CCEs that corresponds to at least one subcarrier spacing of the terminal device in the time unit is increased relative to a reference quantity of channel estimation CCEs, and a maximum quantity of channel estimation CCEs that corresponds to a remaining subcarrier spacing in the first time unit is not decreased relative to a reference quantity of channel estimation CCEs.

For a condition satisfied after the quantity of blind detection times and the quantity of channel estimation CCEs are increased, refer to the fourth and the fifth possible implementations. Details are not described herein again.

Further, in the N subcarrier spacings, for the $i^{th}$ subcarrier spacing, Zi and Yi further satisfy the following condition:

Zi≤Yi≤p×Zi, where p is greater than 1 and less than or equal to 16. For example, a value of p may be 12, 16, 16/1.32, or a decimal greater than 1. Examples are not listed one by one herein for description.

In this implementation, one time unit is a half slot, which is half of that in an existing mobile communications protocol. A quantity of blind detection times of the terminal device in one time unit is correspondingly increased, so that a quantity of opportunities of scheduling a URLLC service for the terminal device in one time unit is increased, thereby reducing a URLLC service latency for the terminal device. Correspondingly, a quantity of channel estimation CCEs for channel estimation by the terminal device in one time unit is increased, which is equivalent to that a quantity of CCEs that can be used for PDCCH transmission in one time unit is increased, thereby improving URLLC service reliability.

In this embodiment, when a length of the time unit is a half slot, there may further be a seventh possible implementation to a ninth possible implementation.

Seventh possible implementation: the blind detection capability of the terminal device includes the N maximum quantities of blind detection times corresponding to the N subcarrier spacings in the time unit. For one of the N subcarrier spacings, a first ratio is greater than a second ratio, and for a subcarrier spacing other than the one subcarrier spacing in the N subcarrier spacings, a first ratio is not less than a second ratio. In other words, a maximum quantity of blind detection times that corresponds to at least one subcarrier spacing of the terminal device in the time unit is decreased relative to a reference value, but a maximum quantity of blind detection times that corresponds to the at least one subcarrier spacing in one slot is increased relative to the reference value; a maximum quantity of blind detection times that corresponds to a remaining subcarrier spacing in the time unit is not decreased relative to a reference value, and a maximum quantity of blind detection times that corresponds to the remaining subcarrier spacing in one slot is not decreased relative to the reference value.

In this scenario, in ascending order of the N subcarrier spacings, a maximum quantity of blind detection times that corresponds to the $i^{th}$ subcarrier spacing may be 1/Wi of a reference quantity of blind detection times that corresponds to the $i^{th}$ subcarrier spacing, where 1≤i≤4, W1, W2, and W3 are greater than or equal to 1, W4 is greater than 1, and W1 to W4 satisfy the following condition: W1≤W2≤W3≤W4≤2.

In this implementation, a quantity of blind detection times of the terminal device in one time unit may be shown in Table 11-1.

TABLE 11-1

| Subcarrier spacing | Quantity of blind detection times |
|---|---|
| 15 kHz | 44/W1 |
| 30 kHz | 36/W2 |
| 60 kHz | 22/W3 |
| 120 kHz | 20/W4 |

For example, a quantity of blind detection times of the terminal device in one time unit may be shown in Table 11-2.

TABLE 11-2

| Subcarrier spacing | Quantity of blind detection times |
|---|---|
| 15 kHz | 36 |
| 30 kHz | 22 |
| 60 kHz | 11 |
| 20 | 10 |

For example, W1=1.22, W2=1.63, W3=2, W1=2, W1, W2, and W3 are greater than or equal to 1, and W4 is greater than 1. In other words, this satisfies one of expression forms of W1≤W2≤W3≤W4≤2.

In another equivalent implementation, in ascending order of the N subcarrier spacings, a maximum quantity of blind detection times that corresponds to the $i^{th}$ subcarrier spacing is decreased by Zi compared with a reference quantity of blind detection times that corresponds to the $i^{th}$ subcarrier spacing, where 1≤i≤4, Z1 to Z3 are integers greater than or equal to 0, Z4 is an integer greater than 0, and Z1 to Z4 are integers greater than or equal to 0 and satisfy the following condition:

Z1≤Z2≤Z3≤Z4, and Zi<$Z_B$i/2, where $Z_B$i is the reference quantity of blind detection times that corresponds to the $i^{th}$ subcarrier spacing.

In this implementation, a quantity of blind detection times of the terminal device in one time unit may be shown in Table 12-1.

TABLE 12-1

| Subcarrier spacing | Quantity of blind detection times |
|---|---|
| 15 kHz | 44-Z1 |
| 30 kHz | 36-Z2 |
| 60 kHz | 22-Z3 |
| 120 kHz | 20-Z4 |

For example, a quantity of blind detection times of the terminal device in one time unit may be shown in Table 12-2.

TABLE 12-2

| Subcarrier spacing | Quantity of blind detection times |
|---|---|
| 15 kHz | 36 |
| 30 kHz | 28 |
| 60 kHz | 14 |
| 20 | 12 |

For example, Z1=8, Z2=8, Z3=8, Z1=8, and Zi<$Z_B$i/2. In other words, this satisfies Z1≤Z2≤Z3≤Z4.

In this implementation, one time unit is a half slot, which is half of that in an existing mobile communications protocol. Although a quantity of blind detection times of the terminal device in one time unit is decreased, a subtracted quantity of times is less than a half of a reference quantity of blind detection times, and the quantity of blind detection times of the terminal device in one time unit is still increased compared with that in the existing communications protocol. Therefore, a quantity of opportunities of scheduling a URLLC service for the terminal device in one time unit can be increased, thereby reducing a URLLC service latency for the terminal device.

Eighth possible implementation: the blind detection capability of the terminal device includes the N maximum quantities of channel estimation CCEs corresponding to the N subcarrier spacings in the time unit. For the one subcarrier spacing, a third ratio is greater than a fourth ratio, and for the subcarrier spacing other than the one subcarrier spacing in the N subcarrier spacings, a third ratio is not less than a fourth ratio. In other words, a maximum quantity of channel estimation CCEs that corresponds to at least one subcarrier spacing of the terminal device in the time unit is decreased relative to a reference quantity of channel estimation CCEs, but a maximum quantity of channel estimation CCEs that corresponds to the at least one subcarrier spacing in one slot is increased relative to the reference quantity of channel estimation CCEs; a maximum quantity of channel estimation CCEs that corresponds to a remaining subcarrier spacing in the first time unit is not decreased relative to a reference quantity of channel estimation CCEs, and a maximum quantity of channel estimation CCEs that corresponds to the remaining subcarrier spacing in one slot is not decreased relative to the reference quantity of channel estimation CCEs.

In this scenario, in ascending order of the N subcarrier spacings, a maximum quantity of channel estimation CCEs that corresponds to the $i^{th}$ subcarrier spacing is 1/Xi of a reference quantity of channel estimation CCEs that corresponds to the $i^{th}$ subcarrier spacing, where 1≤i≤4, X1, X2, and X3 are greater than or equal to 1, X4 is greater than 1, and X1 to X4 satisfy the following condition:

$X1 \le X2 \le X3 \le X4 \le 2$.

In this implementation, a quantity of channel estimation CCEs of the terminal device in one time unit may be shown in Table 13-1.

TABLE 13-1

| Subcarrier spacing | Quantity of channel estimation CCEs |
|---|---|
| 15 kHz | 56/X1 |
| 30 kHz | 56/X2 |
| 60 kHz | 48/X3 |
| 120 kHz | 32/X4 |

For example, a quantity of channel estimation CCEs of the terminal device in one time unit may be shown in Table 13-2.

TABLE 13-2

| Subcarrier spacing | Quantity of channel estimation CCEs |
|---|---|
| 15 kHz | 48 |
| 30 kHz | 48 |
| 60 kHz | 24 |
| 120 kHz | 16 |

For example, X1=1.16, X2=1.16, X3=2, X4=2, X1, X2, and X3 are greater than or equal to 1, and X4 is greater than 1. In other words, this satisfies one of expression forms of X1≤X2≤X3≤X4≤2.

In another equivalent implementation, in ascending order of the N subcarrier spacings, a maximum quantity of channel estimation CCEs that corresponds to the $i^{th}$ subcarrier spacing is decreased by Yi compared with a reference quantity of channel estimation CCEs that corresponds to the $i^{th}$ subcarrier spacing, where 1≤i≤4, Y1 to Y3 are integers greater than 0, Y4 is an integer not equal to 0, and the following conditions are satisfied:

Y1≤Y2≤Y3≤Y4, and Yi<$Y_B$i/2, where $Y_B$i is the reference quantity of channel estimation CCEs that corresponds to the $i^{th}$ subcarrier spacing.

In this implementation, a quantity of channel estimation CCEs of the terminal device in one time unit may be shown in Table 14-1.

TABLE 14-1

| Subcarrier spacing | Quantity of channel estimation CCEs |
|---|---|
| 15 kHz | 56-Y1 |
| 30 kHz | 56-Y2 |
| 60 kHz | 48-Y3 |
| 120 kHz | 32-Y4 |

For example, a quantity of channel estimation CCEs of the terminal device in one time unit may be shown in Table 14-2.

TABLE 14-2

| Subcarrier spacing | Quantity of channel estimation CCEs |
|---|---|
| 15 kHz | 48 |
| 30 kHz | 48 |
| 60 kHz | 32 |
| 120 kHz | 16 |

For example, Y1=8, Y2=8, Y3=16, Y4=16, $Y_\beta i$ is the reference quantity of channel estimation CCEs that corresponds to the $i^{th}$ subcarrier spacing, and Yi<$Y_\beta i$/2. In other words, this satisfies one of expression forms of Y1≤Y2≤Y3≤Y4.

In this implementation, one time unit is a half slot, which is half of a slot size stipulated in an existing mobile communications protocol. Although a quantity of channel estimation CCEs for channel estimation by the terminal device in one time unit is decreased, a subtracted quantity is less than a half of a reference quantity of channel estimation CCEs. This is equivalent to that a quantity of CCEs that can be used for PDCCH transmission in one time unit is increased. Therefore, URLLC service reliability is improved.

Ninth possible implementation: the blind detection capability of the terminal device includes the N maximum quantities of blind detection times corresponding to the N subcarrier spacings in the time unit. For one of the N subcarrier spacings, a first ratio is greater than a second ratio, and for a subcarrier spacing other than the one subcarrier spacing in the N subcarrier spacings, a first ratio is not less than a second ratio. In other words, a maximum quantity of blind detection times that corresponds to at least one subcarrier spacing of the terminal device in the time unit is decreased relative to a reference value, but a maximum quantity of blind detection times that corresponds to the at least one subcarrier spacing in one slot is increased relative to the reference value; a maximum quantity of blind detection times that corresponds to a remaining subcarrier spacing in the time unit is not decreased relative to a reference value. The blind detection capability of the terminal device further includes the N maximum quantities, of channel estimation CCEs, corresponding to the N subcarrier spacings in the time unit. For the one subcarrier spacing, a third ratio is greater than a fourth ratio, and for the subcarrier spacing other than the one subcarrier spacing in the N subcarrier spacings, a third ratio is not less than a fourth ratio. In other words, a maximum quantity of channel estimation CCEs that corresponds to at least one subcarrier spacing of the terminal device in the time unit is decreased relative to a reference quantity of channel estimation CCEs, but a maximum quantity of channel estimation CCEs that corresponds to the at least one subcarrier spacing in one slot is increased relative to the reference quantity of channel estimation CCEs; a maximum quantity of channel estimation CCEs that corresponds to a remaining subcarrier spacing in the first time unit is increased and not decreased relative to a reference quantity of channel estimation CCEs.

For a condition satisfied after the quantity of blind detection times and the quantity of channel estimation CCEs are decreased, refer to the seventh and the eighth possible implementations. Details are not described herein again.

In this implementation, one time unit is a half slot, which is half of a slot size stipulated in an existing mobile communications protocol. Although a quantity of blind detection times of the terminal device in one time unit is decreased, a subtracted quantity of times is less than a half of a reference quantity of blind detection times, and the quantity of blind detection times of the terminal device in one time unit is still increased compared with that in the existing communications protocol. Therefore, a quantity of opportunities of scheduling a URLLC service for the terminal device in one time unit can be increased, thereby reducing a URLLC service latency for the terminal device. Correspondingly, although a quantity of channel estimation CCEs for channel estimation by the terminal device in one time unit is decreased, a subtracted quantity is less than a half of a reference quantity of channel estimation CCEs. This is equivalent to that a quantity of CCEs that can be used for PDCCH transmission in one time unit is increased. Therefore, URLLC service reliability is improved.

In this embodiment, when a length of the time unit is a half slot, there may further be a tenth possible implementation and an eleventh possible implementation.

The tenth possible implementation is a combination of the fourth possible implementation and the eighth possible implementation, and details are not described again.

In this implementation, one time unit is a half slot, which is half of a time unit length in an existing mobile communications protocol. A quantity of blind detection times of the terminal device in one time unit is correspondingly increased, so that a quantity of opportunities of scheduling a URLLC service for the terminal device in one time unit is increased, thereby reducing a URLLC service latency for the terminal device. Correspondingly, although a quantity of channel estimation CCEs for channel estimation by the terminal device in one time unit is decreased, a subtracted quantity is less than a half of a reference quantity of channel estimation CCEs. This is equivalent to that a quantity of CCEs that can be used for PDCCH transmission in one time unit is increased. Therefore, URLLC service reliability is improved.

The eleventh possible implementation is a combination of the fifth possible implementation and the seventh possible implementation, and details are not described again.

In this implementation, one time unit is a half slot, which is half of a slot size stipulated in an existing mobile communications protocol. Although a quantity of blind detection times of the terminal device in one time unit is decreased, a subtracted quantity of times is less than a half of a reference quantity of blind detection times, and the quantity of blind detection times of the terminal device in one time unit is still increased compared with that in the existing communications protocol. Therefore, a quantity of opportunities of scheduling a URLLC service for the terminal device in one time unit can be increased, thereby reducing a URLLC service latency for the terminal device. In this implementation, one time unit is a half slot, which is half of the slot size stipulated in the existing mobile communications protocol. A quantity of channel estimation CCEs for channel estimation by the terminal device in one time unit is increased. This is equivalent to that a quantity of CCEs that can be used for PDCCH transmission in one time unit is increased. In other words, this is equivalent to that a quantity of resources occupied by a PDCCH is increased. Therefore, URLLC service reliability is improved.

In this embodiment, when a length of the time unit is a half slot, there may further be a twelfth possible implementation.

In the twelfth possible implementation, a maximum quantity of blind detection times of the terminal device in one time unit is equal to a reference quantity of blind detection times. For example, this may be shown in Table 15.

TABLE 15

| Subcarrier spacing | Reference quantity of blind detection times |
| --- | --- |
| 15 kHz | 44 |
| 30 kHz | 36 |
| 60 kHz | 22 |
| 120 kHz | 20 |

In step 204, before performing PDCCH blind detection, the terminal device needs to determine, based on the PDCCH configuration information, a second quantity of candidate PDCCHs on which the terminal device needs to perform blind detection in the time unit.

In this embodiment, the second quantity of candidate PDCCHs on which blind detection needs to be performed in the time unit is a sum of second quantities of candidate PDCCHs on which blind detection needs to be performed in the time unit on all of the O blind detection occasions.

It can be noted that, although the PDCCH configuration information may include the first quantity of candidate PDCCHs at each of the at least one aggregation level on one blind detection occasion, the first quantity of candidate PDCCHs may not be a quantity of candidate PDCCHs on which the terminal device finally needs to perform blind detection. The terminal device needs to determine, based on an actual situation, a quantity of candidate PDCCHs on which blind detection needs to be performed in the time unit on each blind detection occasion. In this embodiment, a quantity of candidate PDCCHs on which the terminal device actually needs to perform blind detection in the time unit on each blind detection occasion is referred to as the second quantity of candidate PDCCHs.

The following describes in detail how to determine a second quantity of candidate PDCCHs on which blind detection needs to be performed in the time unit on any one of the O blind detection occasions.

When the PDCCH configuration information includes the first quantity of candidate PDCCHs at each of the at least one aggregation level on one blind detection occasion, the second quantity of candidate PDCCHs on which blind detection needs to be performed in the time unit on any one of the O blind detection occasions is determined in the following manner:

Scenario 1: In b symbols occupied by any one of the O blind detection occasions, if the first a symbols are located in the time unit, and the last (b-a) symbols are not located in the time unit, a corresponding second quantity of candidate PDCCHs is 0 or P×a/b, where a<b, $$P = \sum_L \{M^{(L)}\},$$

and $M^{(L)}$ is a first quantity of candidate PDCCHs at an aggregation level L in the at least one aggregation level on one blind detection occasion.

Figure 4:
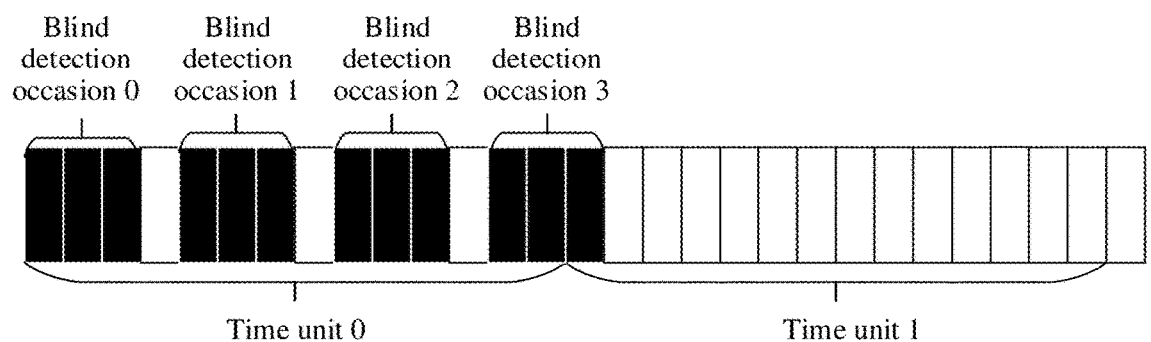
FIG. 4 is a schematic diagram of blind detection according to an embodiment.

For example, as shown in FIG. 4, a blind detection occasion 3 occupies three symbols, where the first two symbols are located in a time unit 0, and the last one symbol is located in a time unit 1. Therefore, for the blind detection occasion 3, a corresponding second quantity of candidate PDCCHs in the time unit 0 is 0 or P×2/3.

It can be noted that, in this scenario, whether a specific value of the corresponding second quantity of candidate PDCCHs is 0 or P×a/b may be determined based on a pre-agreed value. For example, in this scenario, the pre-agreed value is 0, and the corresponding second quantity of candidate PDCCHs is 0. With reference to the foregoing example, in FIG. 4, for the blind detection occasion 3, the corresponding second quantity of candidate PDCCHs in the time unit 0 is 0. Correspondingly, if the pre-agreed value is P×a/b, the corresponding second quantity of candidate PDCCHs is P×a/b. With reference to the foregoing example, in FIG. 4, for the blind detection occasion 3, the corresponding second quantity of candidate PDCCHs in the time unit 0 is P×2/3.

Scenario 2: In b symbols occupied by any one of the O blind detection occasions, if the last c symbols are located in the time unit, and the first (b-c) symbols are not located in the time unit, a corresponding second quantity of candidate PDCCHs is 0, P×c/b, or P, where $$c < b, P = \sum_L \{M^{(L)}\},$$

and $M^{(L)}$ is a first quantity of candidate PDCCHs at an aggregation level L in the at least one aggregation level on one blind detection occasion.

For example, as shown in FIG. 4, assuming that blind detection needs to be performed in a time unit 1, a blind detection occasion 3 occupies three symbols, where the last one symbol is located in the time unit 1, and the first two symbols are located in a time unit 0. Therefore, for the blind detection occasion 3, a corresponding second format of candidate PDCCHs in the time unit 1 is 0, P×1/3, or P.

It can be noted that, in this scenario, whether a specific value of the corresponding second quantity of candidate PDCCHs is 0, P, or P×a/b may be determined based on a pre-agreed value. Details are not described herein.

Scenario 3: If b symbols occupied by any one of the O blind detection occasions are all located in the time unit, a corresponding second quantity of candidate PDCCHs is P.

For example, as shown in FIG. 4, assuming that the time unit is a time unit 0, a blind detection occasion 2 occupies three symbols, and the three symbols are all located in the time unit 0. In this case, a corresponding second quantity of candidate PDCCHs is P.

Scenario 4: If none of b symbols occupied by any one of the O blind detection occasions is located in the time unit, a corresponding quantity of candidate PDCCHs is 0.

Scenario 5: In b symbols occupied by one of the O blind detection occasions, if the first a symbols are located in the time unit, and the last (b-a) symbols are not located in the time unit, a corresponding second quantity of candidate PDCCHs is 0, where a<b; in b symbols occupied by another blind detection occasion in the O blind detection occasions, if the last c symbols are located in the time unit, and the first (b-c) symbols are not located in the time unit, a corresponding second quantity of candidate PDCCHs is 0 or P, where c<b, $$P = \sum_L \{M^{(L)}\},$$

and $M^{(L)}$ is a first quantity of candidate PDCCHs at an aggregation level L in the at least one aggregation level on one blind detection occasion.

In other words, in b symbols occupied by one of the O blind detection occasions, if the first a symbols are located in the time unit, and the last (b-a) symbols are located in a time unit adjacent to the time unit, a corresponding second quantity of candidate PDCCHs in the time unit is 0, where a<b; and a corresponding second quantity of candidate PDCCHs in the next time unit is 0 or P, where c<b, $$P = \sum_L \{M^{(L)}\},$$

and $M^{(L)}$ is the first quantity of candidate PDCCHs at the aggregation level L in the at least one aggregation level on one blind detection occasion.

For example, as shown in FIG. 4, assuming that the time unit is a time unit 0, a blind detection occasion 3 occupies three symbols, where the first two symbols are located in the time unit 0, and the last one symbol is located in a time unit 1. Therefore, for the blind detection occasion 3, a corresponding second quantity of candidate PDCCHs in the time unit 0 is 0. Assuming that the time unit is a time unit 1, a blind detection occasion 3 occupies three symbols, where the last one symbol is located in the time unit 1, and the first two symbols are located in a time unit 0. Therefore, for the blind detection occasion 3, a corresponding second format of candidate PDCCHs in the time unit 1 is 0 or P.

In other words, when one blind detection occasion crosses two time units, a second quantity of candidate PDCCHs that corresponds to the blind detection occasion is 0 in each of the two time units; or a corresponding second quantity of candidate PDCCHs in the first time unit is 0, and a corresponding second quantity of candidate PDCCHs in the second time unit is a first quantity of candidate PDCCHs that corresponds to the blind detection occasion.

Scenario 6: In b symbols occupied by one of the O blind detection occasions, if the first a symbols are located in the time unit, and the last (b-a) symbols are not located in the time unit, a corresponding second quantity of candidate PDCCHs is P×a/b, where a<b; in b symbols occupied by another blind detection occasion in the O blind detection occasions, if the last c symbols are located in the time unit, and the first (b-c) symbols are not located in the time unit, a corresponding second quantity of candidate PDCCHs is P×c/b, where c<b, $$P = \sum_L \{M^{(L)}\},$$

and $M^{(L)}$ is a first quantity of candidate PDCCHs at an aggregation level L in the at least one aggregation level on one blind detection occasion.

In other words, in b symbols occupied by one of the O blind detection occasions, if the first a symbols are located in the time unit, and the last (b-a) symbols are located in a time unit adjacent to the time unit, a corresponding second quantity of candidate PDCCHs in the time unit is P×a/b, where a<b; and a corresponding second quantity of candidate PDCCHs in the next time unit is P×c/b or P, where c=b-a, $$P = \sum_L \{M^{(L)}\},$$

and $M^{(L)}$ is the first quantity of candidate PDCCHs at the aggregation level L in the at least one aggregation level on one blind detection occasion.

For example, as shown in FIG. 4, assuming that the time unit is a time unit 0, a blind detection occasion 3 occupies three symbols, where the first two symbols are located in the time unit 0, and the last one symbol is located in a time unit 1. Therefore, for the blind detection occasion 3, a corresponding second quantity of candidate PDCCHs in the time unit 0 is P×2/3. Assuming that the time unit is a time unit 1, a blind detection occasion 3 occupies three symbols, where the last one symbol is located in the time unit 1, and the first two symbols are located in a time unit 0. Therefore, for the blind detection occasion 3, a corresponding second format of candidate PDCCHs in the time unit 1 is P×1/3.

In other words, when one blind detection occasion crosses two time units, first quantities, of candidate PDCCHs, corresponding to the blind detection occasion need to be proportionally divided between the two time units. In the foregoing embodiment, the division is implemented based on a proportion of a quantity of symbols in each time unit.

The proportion in the foregoing embodiment is related to quantities of symbols of the blind detection occasion in the two time units. Alternatively, the proportion may be ½, to be specific, a second quantity of candidate PDCCHs in a current time unit is {P/2}, and a second quantity of candidate PDCCHs in a next time unit is also {P/2}, where {.} represents a rounding operation.

When the PDCCH configuration information includes the first quantity of candidate PDCCHs at each of the at least one aggregation level in one slot, the second quantity of candidate PDCCHs on which blind detection needs to be performed in the time unit on any one of the O blind detection occasions is determined in the following manner:

Scenario 1: In b symbols occupied by any one of the O blind detection occasions, if the first a symbols are located in the time unit, and the last (b-a) symbols are not located in the time unit, a corresponding second quantity of candidate PDCCHs is 0 or P×a/b, where a<b, $$P = \sum_L \{M^{(L)}/O\} \text{ or } P = \left\{\left(\sum_L M^{(L)}\right)\Big/O\right\}$$

(it can be noted that $$P = \left\{\left(\sum_L M^{(L)}\right)\Big/O\right\}$$

is also applicable to another implementation, and details are not described herein), $M^{(L)}$ is a first quantity of candidate PDCCHs at an aggregation level L in the at least one aggregation level in one slot, and $\{.\}$ represents a rounding operation.

It can be noted that, in this scenario, whether a specific value of the corresponding second quantity of candidate PDCCHs is 0 or P×a/b may be determined based on a pre-agreed value. For example, in this scenario, the pre-agreed value is 0, and the corresponding second quantity of candidate PDCCHs is 0. With reference to the foregoing example, in FIG. 4, for a blind detection occasion 3, a corresponding second quantity of candidate PDCCHs in a time unit 0 is 0. Correspondingly, if the pre-agreed value is P×a/b, the corresponding second quantity of candidate PDCCHs is P×a/b. With reference to the foregoing example, in FIG. 4, for a blind detection occasion 3, a corresponding second quantity of candidate PDCCHs in a time unit 0 is P×2/3.

Scenario 2: In b symbols occupied by any one of the O blind detection occasions, if the last c symbols are located in the time unit, and the first (b-c) symbols are not located in the time unit, a corresponding second quantity of candidate PDCCHs is 0, P×c/b, or P, where c<b.

It can be noted that, in this scenario, whether a specific value of the corresponding second quantity of candidate PDCCHs is 0, P, or P×a/b may be determined based on a pre-agreed value. Details are not described herein.

Scenario 3: If b symbols occupied by any one of the O blind detection occasions are all located in the time unit, a corresponding second quantity of candidate PDCCHs is P.

Scenario 4: If none of b symbols occupied by any one of the O blind detection occasions is located in the time unit, a corresponding quantity of candidate PDCCHs is 0.

Scenario 5: In b symbols occupied by one of the O blind detection occasions, if the first a symbols are located in the time unit, and the last (b-a) symbols are not located in the time unit, a corresponding second quantity of candidate PDCCHs is 0, where a<b; in b symbols occupied by another blind detection occasion in the O blind detection occasions, if the last c symbols are located in the time unit, and the first (b-c) symbols are not located in the time unit, a corresponding second quantity of candidate PDCCHs is 0 or P, where c<b, $$P = \sum_L \{M^{(L)}/O\},$$

$M^{(L)}$ is a first quantity of candidate PDCCHs at an aggregation level L in the at least one aggregation level in one slot, and $\{.\}$ represents a rounding operation.

In other words, in b symbols occupied by one of the O blind detection occasions, if the first a symbols are located in the time unit, and the last (b-a) symbols are located in a time unit adjacent to the time unit, a corresponding second quantity of candidate PDCCHs in the time unit is 0, where a<b; and a corresponding second quantity of candidate PDCCHs in the next time unit is 0 or P, where c<b, $$P = \sum_L \{M^{(L)}/O\},$$

$M^{(L)}$ is the first quantity of candidate PDCCHs at the aggregation level L in the at least one aggregation level in one slot, and $\{.\}$ represents the rounding operation.

For example, as shown in FIG. 4, assuming that the time unit is a time unit 0, a blind detection occasion 3 occupies three symbols, where the first two symbols are located in the time unit 0, and the last one symbol is located in a time unit 1. Therefore, for the blind detection occasion 3, a corresponding second quantity of candidate PDCCHs in the time unit 0 is 0. Assuming that the time unit is a time unit 1, a blind detection occasion 3 occupies three symbols, where the last one symbol is located in the time unit 1, and the first two symbols are located in a time unit 0. Therefore, for the blind detection occasion 3, a corresponding second format of candidate PDCCHs in the time unit 1 is 0 or P.

In other words, when one blind detection occasion crosses two time units, a second quantity of candidate PDCCHs that corresponds to the blind detection occasion is 0 in each of the two time units; or a corresponding second quantity of candidate PDCCHs in the first time unit is 0, and a corresponding second quantity of candidate PDCCHs in the second time unit is a first quantity of candidate PDCCHs that corresponds to the blind detection occasion.

Scenario 6: In b symbols occupied by one of the O blind detection occasions, if the first a symbols are located in the time unit, and the last (b-a) symbols are not located in the time unit, a corresponding second quantity of candidate PDCCHs is P×a/b, where a<b; in b symbols occupied by another blind detection occasion in the O blind detection occasions, if the last c symbols are located in the time unit, and the first (b-c) symbols are not located in the time unit, a corresponding second quantity of candidate PDCCHs is P×c/b, where c<b, $$P = \sum_L \{M^{(L)}/O\},$$

$M^{(L)}$ is a first quantity of candidate PDCCHs at an aggregation level L in the at least one aggregation level in one slot, and $\{.\}$ represents a rounding operation.

In other words, in b symbols occupied by one of the O blind detection occasions, if the first a symbols are located in the time unit, and the last (b-a) symbols are located in a time unit adjacent to the time unit, a corresponding second quantity of candidate PDCCHs in the time unit is P×a/b, where a<b; and a corresponding second quantity of candidate PDCCHs in the next time unit is P×c/b or P, where c=b−a, $$P = \sum_L \{M^{(L)}/O\},$$

$M^{(L)}$ is the first quantity of candidate PDCCHs at the aggregation level L in the at least one aggregation level in one slot, and $\{.\}$ represents the rounding operation.

For example, as shown in FIG. 4, assuming that the time unit is a time unit 0, a blind detection occasion 3 occupies three symbols, where the first two symbols are located in the time unit 0, and the last one symbol is located in a time unit 1. Therefore, for the blind detection occasion 3, a corresponding second quantity of candidate PDCCHs in the time unit 0 is P×2/3. Assuming that the time unit is a time unit 1, a blind detection occasion 3 occupies three symbols, where the last one symbol is located in the time unit 1, and the first two symbols are located in a time unit 0. Therefore, for the blind detection occasion 3, a corresponding second format of candidate PDCCHs in the time unit 1 is P×1/3.

In other words, when one blind detection occasion crosses two time units, first formats, of candidate PDCCHs, corresponding to the blind detection occasion need to be proportionally divided between the two time units.

In the foregoing embodiment, the division is implemented based on a proportion of a quantity of symbols in each time unit. The proportion in the foregoing embodiment is related to quantities of symbols of the blind detection occasion in the two time units. Alternatively, the proportion may be ½, for example, a second quantity of candidate PDCCHs in a current time unit is {P/2}, and a second quantity of candidate PDCCHs in a next time unit is also {P/2}, where {.} represents a rounding operation.

In this embodiment, $$P = \sum_L \{M^{(L)}/O\},$$

where $M^{(L)}$ is the first quantity of candidate PDCCHs at the aggregation level L in the at least one aggregation level in one slot, and {.} represents the rounding operation. P means a first quantity of candidate PDCCHs on one blind detection occasion. A value of P may be determined in another manner. This is not limited in the embodiments.

After determining the second quantity of candidate PDCCHs on which blind detection needs to be performed in the time unit, the terminal device may perform blind detection on the PDCCH in the time unit based on the second quantity of candidate PDCCHs on which blind detection needs to be performed in the time unit and the blind detection capability of the terminal device.

Optionally, the terminal device performs PDCCH blind detection in the time unit based on a value relationship between the second quantity of candidate PDCCHs on which blind detection needs to be performed in the time unit and the maximum quantity of blind detection times in the blind detection capability. For example, if a determined quantity of blind detection times is less than the maximum quantity of blind detection times in the blind detection capability of the terminal device or is less than a quantity of remaining blind detection times, PDCCH blind detection is performed based on the determined quantity of blind detection times; otherwise, PDCCH blind detection is not performed. The quantity of remaining blind detection times is a difference obtained by subtracting a quantity of blind detection times of a PDCCH in another search space from the maximum quantity of blind detection times in the blind detection capability of the terminal device.

For example, for a subcarrier spacing 15 kHz, the blind detection capability of the terminal device is shown in Table 16. The network device configures one common search space and two user-specific search spaces for the terminal device. In the common search space CSS, a blind detection period is one blind detection occasion in one slot, for example, within the first three symbols in one slot, and aggregation levels for blind detection are 1, 2, 4, 8, and 16. In addition, a quantity of candidate PDCCHs at each aggregation level on one blind detection occasion is 2, and a quantity of different pieces of DCI for blind detection is 1.

TABLE 16

| Subcarrier spacing | Quantity of blind detection times | Quantity of channel estimation CCEs |
|---|---|---|
| 15 kHz | 66 | 84 |

The two user-specific search spaces are a USS1 and a USS2. In the USS1, a blind detection period is one blind detection occasion in one slot, in this example, on the third symbol, and aggregation levels for blind detection are 4 and 8. In addition, a quantity of candidate PDCCHs at each aggregation level on one blind detection occasion is 2, and a quantity of different pieces of DCI for blind detection is 1.

In the USS2, a blind detection period is four blind detection occasions in one slot, in this example, on the second symbol, the fourth symbol, the sixth symbol, and the eighth symbol, and aggregation levels for blind detection are 4 and 8. In addition, a quantity of candidate PDCCHs at each aggregation level on one blind detection occasion is 2, and a quantity of different pieces of DCI for blind detection is 1.

Assuming that one time unit is one slot, the terminal device determines, based on the foregoing configuration, a second quantity of candidate PDCCHs on which the terminal device needs to perform blind detection in one time unit in each search space. For a specific manner of determining the second quantity of candidate PDCCHs, refer to the foregoing method. Details are not described again. It may be simply assumed that each blind detection occasion does not cross a boundary of a time unit, and a quantity of channel estimation CCEs may be simply assumed.

For the common search space, in one time unit, a required quantity of blind detection times is 5*2*1=10, and a required quantity of channel estimation CCEs is (4+8)*2=24.

For the user-specific search spaces, in one time unit, the following requirements need to be satisfied: For blind detection in the USS1, a required quantity of blind detection times is 2*1*2=4, and a required quantity of channel estimation CCEs is (4+8)*2=24; for blind detection in the USS2, a required quantity of blind detection times is 2*4*2=16, and a required quantity of channel estimation CCEs is (4+8)*2*4=96.

Blind detection is performed preferentially in the common search space. Therefore, before blind detection is performed in the common search space, it is determined that the maximum quantity of blind detection times of the terminal device in one time unit is 66, which is greater than the quantity of blind detection times that is required for the common search space; and it is determined that the maximum quantity of channel estimation CCEs of the terminal device in one time unit is 84, which is greater than the quantity of channel estimation CCEs that is required for the common search space. Therefore, the terminal device may perform blind detection in the common search space in the time unit.

For the USS1, the terminal device determines that a quantity of remaining blind detection times of the terminal device in the time unit is 66−10=54, which is greater than the quantity of blind detection times that is required for the USS1, and a quantity of remaining channel estimation CCEs of the terminal device in the time unit is 84−24=60, which is greater than the quantity of channel estimation CCEs that is required for the USS1. Therefore, the terminal device may perform blind detection in the USS1 in the time unit.

For the USS2, the terminal device determines that a quantity of remaining blind detection times of the terminal device in the time unit is 54−4=50, which is greater than the quantity of blind detection times that is required for the USS2, and a quantity of remaining channel estimation CCEs of the terminal device in the time unit is 60−24=36, which is less than the quantity of channel estimation CCEs that is required for the USS2. Therefore, the terminal device does not perform blind detection in the USS2 in the time unit.

It can be noted that the foregoing method for performing blind detection on the PDCCH in the time unit based on the second quantity of candidate PDCCHs on which blind detection needs to be performed in the time unit and the blind detection capability of the terminal device is merely an example. A specific manner of performing blind detection on the PDCCH in the time unit based on the second quantity of candidate PDCCHs on which blind detection needs to be performed in the time unit and the blind detection capability of the terminal device is not limited in this embodiment, and details are not described herein.

Figure 5:
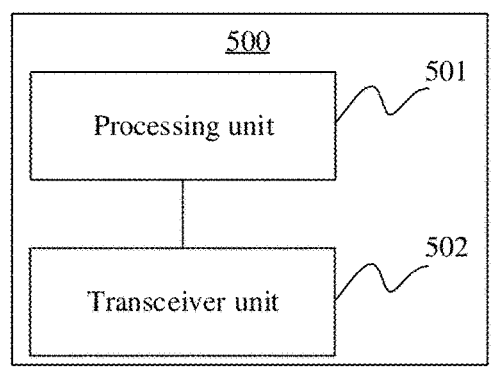
FIG. 5 is a schematic structural diagram of a PDCCH blind detection apparatus according to an embodiment.

FIG. 5 is a schematic structural diagram of a PDCCH blind detection apparatus according to an embodiment. The apparatus is configured to perform behaviors and functions of the terminal device in the foregoing method embodiment. For ease of description, the apparatus is briefly referred to as a terminal device in the following. The terminal device 500 includes a processing unit 501 and a transceiver unit 502.

The processing unit 501 is configured to determine a blind detection capability of the terminal device.

The transceiver unit 502 is configured to perform PDCCH blind detection in one time unit based on the PDCCH configuration information and the blind detection capability of the terminal device.

The blind detection capability of the terminal device includes N maximum quantities of blind detection times corresponding to N subcarrier spacings in the time unit and/or N maximum quantities of channel estimation control channel elements CCEs corresponding to the N subcarrier spacings in the time unit, where N is a positive integer. For one of the N subcarrier spacings, a first ratio is greater than a second ratio, and for a subcarrier spacing other than the one subcarrier spacing in the N subcarrier spacings, a first ratio is not less than a second ratio; and/or for the one subcarrier spacing, a third ratio is greater than a fourth ratio, and for the subcarrier spacing other than the one subcarrier spacing in the N subcarrier spacings, a third ratio is not less than a fourth ratio. The first ratio is a ratio of a maximum quantity of blind detection times that corresponds to the subcarrier spacing to a quantity of symbols included in the time unit. The second ratio is a ratio of a reference quantity of blind detection times that corresponds to the subcarrier spacing to a quantity of symbols included in one slot. The third ratio is a ratio of a maximum quantity of channel estimation CCEs that corresponds to the subcarrier spacing to the quantity of symbols included in the time unit. The fourth ratio is a ratio of a reference quantity of channel estimation CCEs that corresponds to the subcarrier spacing to the quantity of symbols included in one slot.

In an optional implementation, the time unit is one slot.

In an optional implementation, when N is equal to 4, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, where $1 \leq i \leq 4$, W1 is greater than 1, W2, W3, and W4 are greater than or equal to 1, and the following conditions are satisfied: $W1 \geq W2 \geq W3 \geq W4$, and at least one of W1 to W4 is not equal to 2; or when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, where $1 \leq i \leq 4$, Z1 is an integer greater than 0, Z2, Z3, and Z4 are integers greater than or equal to 0, and the following conditions are satisfied: $Z1 \geq Z2 \geq Z3 \geq Z4$, and at least one of Z1 to Z4 is not equal to a reference quantity of blind detection times that corresponds to a corresponding subcarrier spacing.

In an optional implementation, when N is equal to 4, in ascending order of the N subcarrier spacings, a maximum quantity of channel estimation CCEs that corresponds to the $i^{th}$ subcarrier spacing is Xi times a reference quantity of channel estimation CCEs that corresponds to the $i^{th}$ subcarrier spacing, where $1 \leq i \leq 4$, X1 is greater than 1, X2 to X4 are greater than or equal to 1, and the following conditions are satisfied: $X1 \geq X2 \geq X3 \geq X4$, and at least one of X1 to X4 is not equal to 2; or when N is equal to 4, in ascending order of the N subcarrier spacings, a maximum quantity of channel estimation CCEs that corresponds to the $i^{th}$ subcarrier spacing is increased by Yi compared with a reference quantity of channel estimation CCEs that corresponds to the $i^{th}$ subcarrier spacing, where $1 \leq i \leq 4$, Y1 is an integer not equal to 0, Y2 to Y4 are integers greater than or equal to 0, and the following conditions are satisfied: $Y1 \geq Y2 \geq Y3 \geq Y4$, and at least one of Y1 to Y4 is not equal to a maximum quantity of channel estimation CCEs that corresponds to a corresponding subcarrier spacing.

In an optional implementation, the time unit is a half slot.

In an optional implementation, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, where $1 \leq i \leq 4$, W1 is greater than 1, W2, W3, and W4 are greater than or equal to 1, and W1 to W4 satisfy the following condition: $W1 \geq W2 \geq W3 \geq W4$; or when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, where $1 \leq i \leq 4$, Z1 is an integer greater than 0, Z2 to Z4 are integers greater than or equal to 0, and the following condition is satisfied: $Z1 \geq Z2 \geq Z3 \geq Z4$.

In an optional implementation, when N is equal to 4, in ascending order of the N subcarrier spacings, a maximum quantity of channel estimation CCEs that corresponds to the $i^{th}$ subcarrier spacing is Xi times a reference quantity of channel estimation CCEs that corresponds to the $i^{th}$ subcarrier spacing, where $1 \leq i \leq 4$, X1 is greater than 1, X2 to X4 are greater than or equal to 1, and the following condition is satisfied: $X1 \geq X2 \geq X3 \geq X4$; or when N is equal to 4, in ascending order of the N subcarrier spacings, a maximum quantity of channel estimation CCEs that corresponds to the $i^{th}$ subcarrier spacing is increased by Yi compared with a reference quantity of channel estimation CCEs that corresponds to the $i^{th}$ subcarrier spacing, where $1 \leq i \leq 4$, Y1 is an integer not equal to 0, Y2 to Y4 are integers greater than or equal to 0, and the following condition is satisfied: $Y1 \geq Y2 \geq Y3 \geq Y4$.

In an optional implementation, for the $i^{th}$ subcarrier spacing, Zi and Yi satisfy $Zi \leq Yi \leq p \times Zi$, where p is greater than 1 and less than or equal to 16.

In an optional implementation, when N is equal to 4, in ascending order of the N subcarrier spacings, a maximum quantity of blind detection times that corresponds to the $i^{th}$ subcarrier spacing is 1/Wi of a reference quantity of blind detection times that corresponds to the $i^{th}$ subcarrier spacing, where $1 \leq i \leq 4$, W1, W2, and W3 are greater than or equal to 1, W4 is greater than 1, and W1 to W4 satisfy the following condition: $W1 \leq W2 \leq W3 \leq W4 \leq 2$; or when N is equal to 4, in ascending order of the N subcarrier spacings, a maximum quantity of blind detection times that corresponds to the $i^{th}$ subcarrier spacing is decreased by Zi compared with a reference quantity of blind detection times that corresponds to the $i^{th}$ subcarrier spacing, where $1 \leq i \leq 4$, Z1 to Z3 are integers greater than or equal to 0, Z4 is an integer greater than 0, and the following conditions are satisfied: $Z1 \leq Z2 \leq Z3 \leq Z4$, and $Zi < Z_B i/2$, where $Z_B i$ is the reference quantity of blind detection times that corresponds to the $i^{th}$ subcarrier spacing.

In an optional implementation, when N is equal to 4, in ascending order of the N subcarrier spacings, a maximum quantity of channel estimation CCEs that corresponds to the $i^{th}$ subcarrier spacing is 1/Xi of a reference quantity of channel estimation CCEs that corresponds to the $i^{th}$ subcarrier spacing, where $1 \leq i \leq 4$, X1, X2, and X3 are greater than or equal to 1, X4 is greater than 1, and X1 to X4 satisfy the following condition: $X1 \leq X2 \leq X3 \leq X4 \leq 2$; or when N is equal to 4, in ascending order of the N subcarrier spacings, a maximum quantity of channel estimation CCEs that corresponds to the $i^{th}$ subcarrier spacing is decreased by Yi compared with a reference quantity of channel estimation CCEs that corresponds to the $i^{th}$ subcarrier spacing, where $1 \leq i \leq 4$, Y1 to Y3 are integers greater than 0, Y4 is an integer not equal to 0, and the following conditions are satisfied: $Y1 \leq Y2 \leq Y3 \leq Y4$, and $Yi < Y_B i/2$, where $Y_B i$ is the reference quantity of channel estimation CCEs that corresponds to the $i^{th}$ subcarrier spacing.

In an optional implementation, the PDCCH configuration information includes at least one aggregation level and a quantity of candidate PDCCHs at each of the at least one aggregation level in a half slot.

In an optional implementation, the PDCCH configuration information includes a quantity b of symbols occupied by a control resource set and O start symbol locations of the control resource set, where O>0, and b>0. The quantity b of symbols occupied by the control resource set and the O start symbol locations are used to determine a time-domain symbol location occupied by each of O blind detection occasions, and each of the O blind detection occasions occupies b symbols.

In an optional implementation, the b symbols occupied by each of the O blind detection occasions do not cross two different time units, or do not cross a boundary of the time unit.

In an optional implementation, the PDCCH configuration information further includes a first quantity of candidate PDCCHs at each of the at least one aggregation level on one blind detection occasion, and the performing, by the terminal device, PDCCH blind detection in one time unit based on the PDCCH configuration information and the blind detection capability of the terminal device includes:

determining, by the terminal device based on the PDCCH configuration information, a second quantity of candidate PDCCHs on which the terminal device needs to perform blind detection in the time unit, where the second quantity of candidate PDCCHs on which blind detection needs to be performed in the time unit is a sum of second quantities of candidate PDCCHs on which blind detection needs to be performed in the time unit on all of the O blind detection occasions, and a second quantity of candidate PDCCHs on which blind detection needs to be performed in the time unit on any one of the O blind detection occasions is at least one of the following:

in b symbols occupied by any one of the O blind detection occasions, if the first a symbols are located in the time unit, and the last (b-a) symbols are not located in the time unit, a corresponding second quantity of candidate PDCCHs is 0 or P×a/b, where a<b, $$P = \sum_L \{M^{(L)}\},$$

and $M^{(L)}$ is a first quantity of candidate PDCCHs at an aggregation level L in the at least one aggregation level on one blind detection occasion; or in b symbols occupied by any one of the O blind detection occasions, if the last c symbols are located in the time unit, and the first (b-c) symbols are not located in the time unit, a corresponding second quantity of candidate PDCCHs is 0, P×c/b, or P, where c<b; or if b symbols occupied by any one of the O blind detection occasions are all located in the time unit, a corresponding second quantity of candidate PDCCHs is P; or if none of b symbols occupied by any one of the O blind detection occasions is located in the time unit, a corresponding quantity of candidate PDCCHs is 0; and performing, by the terminal device, blind detection on the PDCCH in the time unit based on the second quantity of candidate PDCCHs on which the terminal device needs to perform blind detection in the time unit and the blind detection capability of the terminal device.

In an optional implementation, the PDCCH configuration information further includes a first quantity of candidate PDCCHs at each of the at least one aggregation level in one slot, and the processing unit 501 is configured to:

determine, based on the PDCCH configuration information, a second quantity of candidate PDCCHs on which the terminal device needs to perform blind detection in the time unit, where the second quantity of candidate PDCCHs on which blind detection needs to be performed in the time unit is a sum of second quantities of candidate PDCCHs on which blind detection needs to be performed in the time unit on all of the O blind detection occasions, and a second quantity of candidate PDCCHs on which blind detection needs to be performed in the time unit on any one of the O blind detection occasions is at least one of the following:

in b symbols occupied by any one of the O blind detection occasions, if the first a symbols are located in the time unit, and the last (b-a) symbols are not located in the time unit, a corresponding second quantity of candidate PDCCHs is 0 or P×a/b, where a<b, $$P = \sum_L \{M^{(L)}/O\},$$

$M^{(L)}$ is a first quantity of candidate PDCCHs at an aggregation level L in the at least one aggregation level in one slot, and {.} represents a rounding operation; or in b symbols occupied by any one of the O blind detection occasions, if the last c symbols are located in the time unit, and the first (b-c) symbols are not located in the time unit, a corresponding second quantity of candidate PDCCHs is 0, P×c/b, or P, where c<b; or if b symbols occupied by any one of the O blind detection occasions are all located in the time unit, a corresponding second quantity of candidate PDCCHs is P; or if none of b symbols occupied by any one of the O blind detection occasions is located in the time unit, a corresponding second quantity of candidate PDCCHs is 0.

The transceiver unit 502 is configured to perform blind detection on the PDCCH in the time unit based on the second quantity of candidate PDCCHs on which blind detection needs to be performed in the time unit and the blind detection capability of the terminal device.

Figure 6:
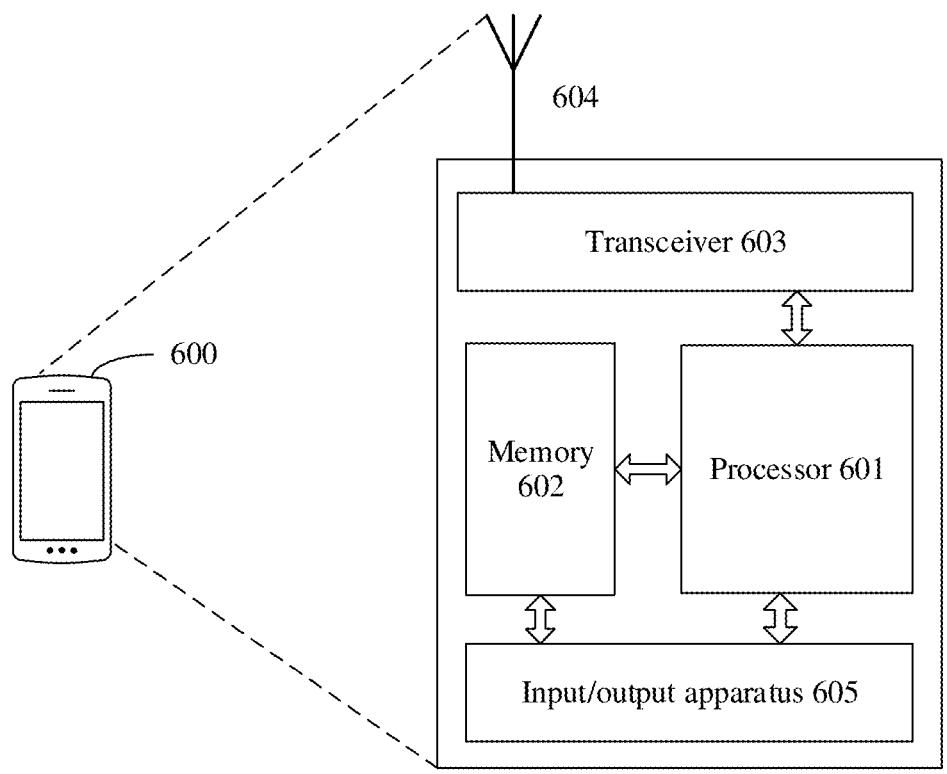
FIG. 6 is a schematic structural diagram of a PDCCH blind detection apparatus according to an embodiment.

Referring to FIG. 6, an embodiment further provides a PDCCH blind detection apparatus. The apparatus is configured to perform behaviors and functions of the terminal device in the foregoing method embodiment. For ease of description, the apparatus is briefly referred to as a terminal device for description below. FIG. 6 shows only main components of the apparatus. As shown in FIG. 6, the terminal device 600 includes a processor 601, a memory 602, a transceiver 603, an antenna 604, and an input/output apparatus 605. The processor 601 is mainly configured to process a communications protocol and communication data, control the communications apparatus, execute a software program, and process data of the software program, for example, is configured to support the communications apparatus in performing the actions described in the foregoing method embodiment. The memory 602 is mainly configured to store a software program and data. The transceiver 603 is mainly configured to perform conversion between a baseband signal and a radio frequency signal and process the radio frequency signal. The antenna 604 is mainly configured to receive and send radio frequency signals in an electromagnetic-wave form. The input/output apparatus 605, for example, a touchscreen, a display screen, or a keyboard, is mainly configured to receive data entered by a user, and output data to the user.

The memory 602 may be configured to store a program instruction. The processor 601 invokes the program instruction stored in the memory 602, to perform the following operation: determining a blind detection capability of the terminal device.

The transceiver 603 is configured to perform PDCCH blind detection in one time unit based on the PDCCH configuration information and the blind detection capability of the terminal device.

The blind detection capability of the terminal device includes N maximum quantities of blind detection times corresponding to N subcarrier spacings in the time unit and/or N maximum quantities of channel estimation control channel elements CCEs corresponding to the N subcarrier spacings in the time unit, where N is a positive integer. For one of the N subcarrier spacings, a first ratio is greater than a second ratio, and for a subcarrier spacing other than the one subcarrier spacing in the N subcarrier spacings, a first ratio is not less than a second ratio; and/or for the one subcarrier spacing, a third ratio is greater than a fourth ratio, and for the subcarrier spacing other than the one subcarrier spacing in the N subcarrier spacings, a third ratio is not less than a fourth ratio. The first ratio is a ratio of a maximum quantity of blind detection times that corresponds to the subcarrier spacing to a quantity of symbols included in the time unit. The second ratio is a ratio of a reference quantity of blind detection times that corresponds to the subcarrier spacing to a quantity of symbols included in one slot. The third ratio is a ratio of a maximum quantity of channel estimation CCEs that corresponds to the subcarrier spacing to the quantity of symbols included in the time unit. The fourth ratio is a ratio of a reference quantity of channel estimation CCEs that corresponds to the subcarrier spacing to the quantity of symbols included in one slot.

The terminal device 600 may further implement another function. For details, refer to the foregoing descriptions. Details are not described herein again.

Figure 7:
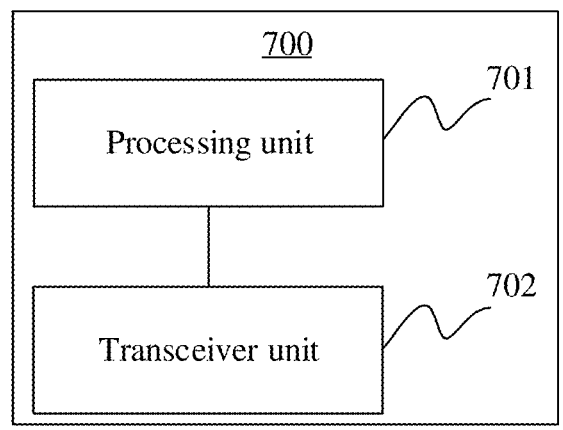
FIG. 7 is a schematic structural diagram of a PDCCH blind detection apparatus according to an embodiment.

FIG. 7 is a schematic structural diagram of a PDCCH blind detection apparatus according to an embodiment. The apparatus is configured to perform behaviors and functions of the network device in the foregoing method embodiment. For ease of description, the apparatus is briefly referred to as a network device. The network device 700 includes a processing unit 701 and a transceiver unit 702.

The processing unit 701 is configured to determine PDCCH configuration information.

The transceiver unit 702 is configured to send a PDCCH to a terminal device based on the PDCCH configuration information and a blind detection capability of the terminal device.

The blind detection capability of the terminal device includes N maximum quantities of blind detection times corresponding to N subcarrier spacings in the one time unit and/or N maximum quantities of channel estimation control channel elements CCEs corresponding to the N subcarrier spacings in the time unit, where N is a positive integer. For one of the N subcarrier spacings, a first ratio is greater than a second ratio, and for a subcarrier spacing other than the one subcarrier spacing in the N subcarrier spacings, a first ratio is not less than a second ratio; and/or for the one subcarrier spacing, a third ratio is greater than a fourth ratio, and for the subcarrier spacing other than the one subcarrier spacing in the N subcarrier spacings, a third ratio is not less than a fourth ratio. The first ratio is a ratio of a maximum quantity of blind detection times that corresponds to the subcarrier spacing to a quantity of symbols included in the time unit. The second ratio is a ratio of a reference quantity of blind detection times that corresponds to the subcarrier spacing to a quantity of symbols included in one slot. The third ratio is a ratio of a maximum quantity of channel estimation CCEs that corresponds to the subcarrier spacing to the quantity of symbols included in the time unit. The fourth ratio is a ratio of a reference quantity of channel estimation CCEs that corresponds to the subcarrier spacing to the quantity of symbols included in one slot.

In an optional implementation, the time unit is one slot.

In an optional implementation, when N is equal to 4, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, where $1 \leq i \leq 4$, W1 is greater than 1, W2, W3, and W4 are greater than or equal to 1, and the following conditions are satisfied: $W1 \geq W2 \geq W3 \geq W4$, and at least one of W1 to W4 is not equal to 2; or when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, where $1 \leq i \leq 4$, Z1 is an integer greater than 0, Z2, Z3, and Z4 are integers greater than or equal to 0, and the following conditions are satisfied: $Z1 \geq Z2 \geq Z3 \geq Z4$, and at least one of Z1 to Z4 is not equal to a reference quantity of blind detection times that corresponds to a corresponding subcarrier spacing.

In an optional implementation, when N is equal to 4, in ascending order of the N subcarrier spacings, a maximum quantity of channel estimation CCEs that corresponds to the $i^{th}$ subcarrier spacing is Xi times a reference quantity of channel estimation CCEs that corresponds to the $i^{th}$ subcarrier spacing, where $1 \leq i \leq 4$, X1 is greater than 1, X2 to X4 are greater than or equal to 1, and the following conditions are satisfied: X1≥X2≥X3≥X4, and at least one of X1 to X4 is not equal to 2; or when N is equal to 4, in ascending order of the N subcarrier spacings, a maximum quantity of channel estimation CCEs that corresponds to the $i^{th}$ subcarrier spacing is increased by Yi compared with a reference quantity of channel estimation CCEs that corresponds to the $i^{th}$ subcarrier spacing, where 1≤i≤4, Y1 is an integer not equal to 0, Y2 to Y4 are integers greater than or equal to 0, and the following conditions are satisfied: Y1≥Y2≥Y3≥Y4, and at least one of Y1 to Y4 is not equal to a maximum quantity of channel estimation CCEs that corresponds to a corresponding subcarrier spacing.

In an optional implementation, the time unit is a half slot.

In an optional implementation, when N is equal to 4, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, where 1≤i≤4, W1 is greater than 1, W2, W3, and W4 are greater than or equal to 1, and W1 to W4 satisfy the following condition: W1≥W2≥W3≥W4; or when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, where 1≤i≤4, Z1 is an integer greater than 0, Z2 to Z4 are integers greater than or equal to 0, and the following condition is satisfied: Z1≥Z2≥Z3≥Z4.

In an optional implementation, when N is equal to 4, in ascending order of the N subcarrier spacings, a maximum quantity of channel estimation CCEs that corresponds to the $i^{th}$ subcarrier spacing is Xi times a reference quantity of channel estimation CCEs that corresponds to the $i^{th}$ subcarrier spacing, where 1≤i≤4, X1 is greater than 1, X2 to X4 are greater than or equal to 1, and the following condition is satisfied: X1≥X2≥X3≥X4; or when N is equal to 4, in ascending order of the N subcarrier spacings, a maximum quantity of channel estimation CCEs that corresponds to the $i^{th}$ subcarrier spacing is increased by Yi compared with a reference quantity of channel estimation CCEs that corresponds to the $i^{th}$ subcarrier spacing, where 1≤i≤4, Y1 is an integer not equal to 0, Y2 to Y4 are integers greater than or equal to 0, and the following condition is satisfied: Y1≥Y2≥Y3≥Y4.

In an optional implementation, for the $i^{th}$ subcarrier spacing, Zi and Yi satisfy Zi≤Yi≤p×Zi, where p is greater than 1 and less than or equal to 16.

In an optional implementation, when N is equal to 4, in ascending order of the N subcarrier spacings, a maximum quantity of blind detection times that corresponds to the $i^{th}$ subcarrier spacing is 1/Wi of a reference quantity of blind detection times that corresponds to the $i^{th}$ subcarrier spacing, where 1≤i≤4, W1, W2, and W3 are greater than or equal to 1, W4 is greater than 1, and W1 to W4 satisfy the following condition: W1≤W2≤W3≤W4≤2; or when N is equal to 4, in ascending order of the N subcarrier spacings, a maximum quantity of blind detection times that corresponds to the $i^{th}$ subcarrier spacing is decreased by Zi compared with a reference quantity of blind detection times that corresponds to the $i^{th}$ subcarrier spacing, where 1≤i≤4, Z1 to Z3 are integers greater than or equal to 0, Z4 is an integer greater than 0, and the following conditions are satisfied: Z1≤Z2≤Z3≤Z4, and Zi<$Z_B$i/2, where $Z_B$i is the reference quantity of blind detection times that corresponds to the $i^{th}$ subcarrier spacing.

In an optional implementation, when N is equal to 4, in ascending order of the N subcarrier spacings, a maximum quantity of channel estimation CCEs that corresponds to the $i^{th}$ subcarrier spacing is 1/Xi of a reference quantity of channel estimation CCEs that corresponds to the $i^{th}$ subcarrier spacing, where 1≤i≤4, X1, X2, and X3 are greater than or equal to 1, X4 is greater than 1, and X1 to X4 satisfy the following condition: X1≤X2≤X3≤X4≤2; or when N is equal to 4, in ascending order of the N subcarrier spacings, a maximum quantity of channel estimation CCEs that corresponds to the $i^{th}$ subcarrier spacing is decreased by Yi compared with a reference quantity of channel estimation CCEs that corresponds to the $i^{th}$ subcarrier spacing, where 1≤i≤4, Y1 to Y3 are integers greater than 0, Y4 is an integer not equal to 0, and the following conditions are satisfied: Y1≤Y2≤Y3≤Y4, and Yi<$Y_B$i/2, where $Y_B$i is the reference quantity of channel estimation CCEs that corresponds to the $i^{th}$ subcarrier spacing.

In an optional implementation, the PDCCH configuration information includes at least one aggregation level and a quantity of candidate PDCCHs at each of the at least one aggregation level in a half slot.

In an optional implementation, the PDCCH configuration information includes a quantity b of symbols occupied by a control resource set and O start symbol locations of the control resource set, where O>0, and b>0. The quantity b of symbols occupied by the control resource set and the O start symbol locations are used to determine a time-domain symbol location occupied by each of O blind detection occasions, and each of the O blind detection occasions occupies b symbols.

In an optional implementation, the b symbols occupied by each of the O blind detection occasions do not cross two different time units, or do not cross a boundary of the time unit.

Figure 8:
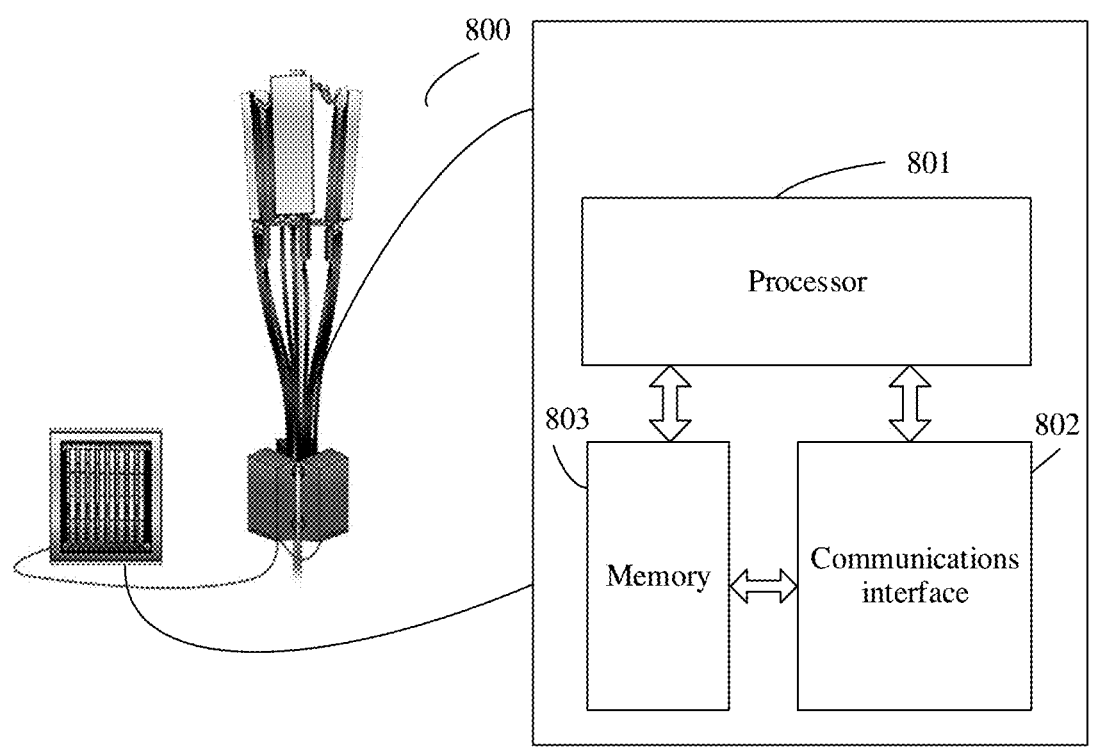
FIG. 8 is a schematic structural diagram of a PDCCH blind detection apparatus according to an embodiment.

Referring to FIG. 8, an embodiment further provides a PDCCH blind detection apparatus, configured to perform behaviors and functions of the network device in the foregoing method embodiment. For ease of description, the apparatus is briefly referred to as a network device in the following. For example, FIG. 8 shows only main components of the network device. As shown in FIG. 8, the network device 800 includes a processor 801, a communications interface 802, and a memory 803.

The memory 803 may be configured to store a program instruction. The processor 801 invokes the program instruction stored in the memory 803, to perform the following operation: determining PDCCH configuration information.

The communications interface 802 is configured to send a PDCCH to a terminal device based on the PDCCH configuration information and a blind detection capability of the terminal device.

The blind detection capability of the terminal device includes N maximum quantities of blind detection times corresponding to N subcarrier spacings in the one time unit and/or N maximum quantities of channel estimation control channel elements CCEs corresponding to the N subcarrier spacings in the time unit, where N is a positive integer. For one of the N subcarrier spacings, a first ratio is greater than a second ratio, and for a subcarrier spacing other than the one subcarrier spacing in the N subcarrier spacings, a first ratio is not less than a second ratio; and/or for the one subcarrier spacing, a third ratio is greater than a fourth ratio, and for the subcarrier spacing other than the one subcarrier spacing in the N subcarrier spacings, a third ratio is not less than a fourth ratio. The first ratio is a ratio of a maximum quantity of blind detection times that corresponds to the subcarrier spacing to a quantity of symbols included in the time unit. The second ratio is a ratio of a reference quantity of blind detection times that corresponds to the subcarrier spacing to a quantity of symbols included in one slot. The third ratio is a ratio of a maximum quantity of channel estimation CCEs that corresponds to the subcarrier spacing to the quantity of symbols included in the time unit. The fourth ratio is a ratio of a reference quantity of channel estimation CCEs that corresponds to the subcarrier spacing to the quantity of symbols included in one slot.

The network device 800 may further implement another function. For details, refer to the foregoing descriptions. Details are not described herein again.

The apparatus embodiments shown in FIG. 5 to FIG. 8 are merely examples of main structures of the apparatuses. For specific execution processes and functions, refer to corresponding behaviors and functions in the method embodiment. Details are not described herein again.

It can be appreciated that a person of ordinary skill in the art can make various modifications and variations to this application without departing from the scope. This embodiments are intended to cover these modifications and variations provided that these modifications and variations fall within the scope of the claims and equivalent technologies thereof.

Method or algorithm steps described with reference to the content disclosed may be implemented by hardware or may be implemented by a processor by executing a software instruction. The software instruction may include a corresponding software module. The software module may be located in a RAM, a flash memory, a ROM, an EPROM, an EEPROM, a register, a hard disk, a removable hard disk, a CD-ROM, or a storage medium in any other form known in the art. For example, the storage medium is coupled to the processor, so that the processor can read information from the storage medium and can write information into the storage medium. Additionally, the storage medium may alternatively be a constituent part of the processor. The processor and the storage medium may be located in an ASIC. In addition, the ASIC may be located in user equipment. Further, the processor and the storage medium may alternatively exist in user equipment as discrete components.

A person of ordinary skill in the art should be aware that, in the foregoing one or more examples, the functions described may be implemented by using hardware, software, firmware, or any combination thereof. When software is used for implementation, these functions may be stored in a computer readable medium or transmitted as one or more instructions or code in a computer readable medium. The computer readable medium includes a computer storage medium and a communications medium. The communications medium includes any medium that facilitates transfer of a computer program from one place to another. The storage medium may be any available medium accessible to a general-purpose or special-purpose computer.

The objectives, technical solutions, and beneficial effects of the embodiments are further described in detail in the foregoing implementations. It can be understood that the foregoing descriptions are merely implementations of the embodiments, but are not intended to limit the protection scope. Any modification, equivalent replacement, improvement, and the like made based on the technical solutions herein shall fall within the protection scope of the present invention.

What is claimed is:

1. A physical downlink control channel (PDCCH) blind detection method, comprising:

determining, by a terminal device, a blind detection capability of the terminal device; and performing, by the terminal device, PDCCH blind detection in one time unit based on PDCCH configuration information and the blind detection capability of the terminal device, wherein the blind detection capability of the terminal device comprises N maximum quantities of blind detection times corresponding to N subcarrier spacings in the time unit and/or N maximum quantities of channel estimation control channel elements (CCEs) corresponding to the N subcarrier spacings in the time unit, wherein N is a positive integer;

for one of the N subcarrier spacings, a first ratio is greater than a second ratio, and for a subcarrier spacing other than the one subcarrier spacing in the N subcarrier spacings, a first ratio is not less than a second ratio; and/or for the one subcarrier spacing, a third ratio is greater than a fourth ratio, and for the subcarrier spacing other than the one subcarrier spacing in the N subcarrier spacings, a third ratio is not less than a fourth ratio; and the first ratio is a ratio of a maximum quantity of blind detection times that corresponds to the subcarrier spacing to a quantity of symbols comprised in the time unit, the second ratio is a ratio of a reference quantity of blind detection times that corresponds to the subcarrier spacing to a quantity of symbols comprised in one slot, the third ratio is a ratio of a maximum quantity of channel estimation CCEs that corresponds to the subcarrier spacing to the quantity of symbols comprised in the time unit, and the fourth ratio is a ratio of a reference quantity of channel estimation CCEs that corresponds to the subcarrier spacing to the quantity of symbols comprised in one slot.

2. The method according to claim 1, wherein the time unit is one slot, when N is equal to 4, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, wherein $1 \leq i \leq 4$, W1 is greater than 1, W2, W3, and W4 are greater than or equal to 1, and the following conditions are satisfied: $W1 \geq W2 \geq W3 \geq W4$, and at least one of W1 to W4 is not equal to 2; or when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, wherein $1 \leq i \leq 4$, Z1 is an integer greater than 0, Z2, Z3, and Z4 are integers greater than or equal to 0, and the following conditions are satisfied: $Z1 \geq Z2 \geq Z3 \geq Z4$, and at least one of Z1 to Z4 is not equal to a reference quantity of blind detection times that corresponds to a corresponding subcarrier spacing.

3. The method according to claim 1, wherein the time unit is a half slot, when N is equal to 4, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, wherein $1 \leq i \leq 4$, W1 is greater than 1, W2, W3, and W4 are greater than or equal to 1, and W1 to W4 satisfy the following condition: $W1 \geq W2 \geq W3 \geq W4$; or when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, wherein $1 \leq i \leq 4$, Z1 is an integer greater than 0, Z2 to Z4 are integers greater than or equal to 0, and the following condition is satisfied: $Z1 \geq Z2 \geq Z3 \geq Z4$.

4. The method according to claim 1, wherein the time unit is a half slot,
wherein when N is equal to 4, in ascending order of the N subcarrier spacings, a maximum quantity of blind detection times that corresponds to the $i^{th}$ subcarrier spacing is 1/Wi of a reference quantity of blind detection times that corresponds to the $i^{th}$ subcarrier spacing, wherein $1 \leq i \leq 4$, W1, W2, and W3 are greater than or equal to 1, W4 is greater than 1, and W1 to W4 satisfy the following condition: $W1 \leq W2 \leq W3 \leq W4 \leq 2$; or
when N is equal to 4, in ascending order of the N subcarrier spacings, a maximum quantity of blind detection times that corresponds to the $i^{th}$ subcarrier spacing is decreased by Zi compared with a reference quantity of blind detection times that corresponds to the $i^{th}$ subcarrier spacing, wherein $1 \leq i \leq 4$, Z1 to Z3 are integers greater than or equal to 0, Z4 is an integer greater than 0, and the following conditions are satisfied: $Z1 \leq Z2 \leq Z3 \leq Z4$, and $Zi \leq Z_B i/2$, wherein $Z_B i$ is the reference quantity of blind detection times that corresponds to the $i^{th}$ subcarrier spacing.

5. The method according to claim 1, wherein the time unit is a half slot,
when N is equal to 4, in ascending order of the N subcarrier spacings, a maximum quantity of channel estimation CCEs that corresponds to the $i^{th}$ subcarrier spacing is Xi times a reference quantity of channel estimation CCEs that corresponds to the $i^{th}$ subcarrier spacing, wherein $1 \leq i \leq 4$, X1 is greater than 1, X2 to X4 are greater than or equal to 1, and the following condition is satisfied: $X1 \geq X2 \geq X3 \geq X4$; or
when N is equal to 4, in ascending order of the N subcarrier spacings, a maximum quantity of channel estimation CCEs that corresponds to the $i^{th}$ subcarrier spacing is increased by Yi compared with a reference quantity of channel estimation CCEs that corresponds to the $i^{th}$ subcarrier spacing, wherein $1 \leq i \leq 4$, Y1 is an integer not equal to 0, Y2 to Y4 are integers greater than or equal to 0, and the following condition is satisfied: $Y1 \geq Y2 \geq Y3 \geq Y4$.

6. A physical downlink control channel (PDCCH) sending method, comprising:
determining, by a network device, PDCCH configuration information; and
sending, by the network device, a PDCCH to a terminal device based on the PDCCH configuration information and a blind detection capability of the terminal device, wherein
the blind detection capability of the terminal device comprises N maximum quantities of blind detection times corresponding to N subcarrier spacings in one time unit and/or N maximum quantities of channel estimation control channel elements (CCEs) corresponding to the N subcarrier spacings in the time unit, wherein N is a positive integer;
for one of the N subcarrier spacings, a first ratio is greater than a second ratio, and for a subcarrier spacing other than the one subcarrier spacing in the N subcarrier spacings, a first ratio is not less than a second ratio; and/or for the one subcarrier spacing, a third ratio is greater than a fourth ratio, and for the subcarrier spacing other than the one subcarrier spacing in the N subcarrier spacings, a third ratio is not less than a fourth ratio; and
the first ratio is a ratio of a maximum quantity of blind detection times that corresponds to the subcarrier spacing to a quantity of symbols comprised in the time unit, the second ratio is a ratio of a reference quantity of blind detection times that corresponds to the subcarrier spacing to a quantity of symbols comprised in one slot, the third ratio is a ratio of a maximum quantity of channel estimation CCEs that corresponds to the subcarrier spacing to the quantity of symbols comprised in the time unit, and the fourth ratio is a ratio of a reference quantity of channel estimation CCEs that corresponds to the subcarrier spacing to the quantity of symbols comprised in one slot.

7. The method according to claim 6, wherein the time unit is one slot,
when N is equal to 4, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, wherein $1 \leq i \leq 4$, W1 is greater than 1, W2, W3, and W4 are greater than or equal to 1, and the following conditions are satisfied: $W1 \geq W2 \geq W3 \geq W4$, and at least one of W1 to W4 is not equal to 2; or
when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, wherein $1 \leq i \leq 4$, Z1 is an integer greater than 0, Z2, Z3, and Z4 are integers greater than or equal to 0, and the following conditions are satisfied: $Z1 \geq Z2 \geq Z3 \geq Z4$, and at least one of Z1 to Z4 is not equal to a reference quantity of blind detection times that corresponds to a corresponding subcarrier spacing.

8. The method according to claim 6, wherein the time unit is a half slot,
when N is equal to 4, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, wherein $1 \leq i \leq 4$, W1 is greater than 1, W2, W3, and W4 are greater than or equal to 1, and W1 to W4 satisfy the following condition: $W1 \geq W2 \geq W3 \geq W4$; or
when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, wherein $1 \leq i \leq 4$, Z1 is an integer greater than 0, Z2 to Z4 are integers greater than or equal to 0, and the following condition is satisfied: $Z1 \geq Z2 \geq Z3 \geq Z4$.

9. The method according to claim 6, wherein the time unit is a half slot,
when N is equal to 4, in ascending order of the N subcarrier spacings, a maximum quantity of channel estimation CCEs that corresponds to the $i^{th}$ subcarrier spacing is Xi times a reference quantity of channel estimation CCEs that corresponds to the $i^{th}$ subcarrier spacing, wherein $1 \leq i \leq 4$, X1 is greater than 1, X2 to X4 are greater than or equal to 1, and the following condition is satisfied: $X1 \geq X2 \geq X3 \geq X4$; or when N is equal to 4, in ascending order of the N subcarrier spacings, a maximum quantity of channel estimation CCEs that corresponds to the $i^{th}$ subcarrier spacing is increased by Yi compared with a reference quantity of channel estimation CCEs that corresponds to the $i^{th}$ subcarrier spacing, wherein $1 \leq i \leq 4$, Y1 is an integer not equal to 0, Y2 to Y4 are integers greater than or equal to 0, and the following condition is satisfied: $Y1 \geq Y2 \geq Y3 \geq Y4$.

10. The method according to claim 6, wherein the time unit is a half slot, when N is equal to 4, in ascending order of the N subcarrier spacings, a maximum quantity of blind detection times that corresponds to the $i^{th}$ subcarrier spacing is 1/Wi of a reference quantity of blind detection times that corresponds to the $i^{th}$ subcarrier spacing, wherein $1 \leq i \leq 4$, W1, W2, and W3 are greater than or equal to 1, W4 is greater than 1, and W1 to W4 satisfy the following condition: $W1 \leq W2 \leq W3 \leq W4 \leq 2$; or when N is equal to 4, in ascending order of the N subcarrier spacings, a maximum quantity of blind detection times that corresponds to the $i^{th}$ subcarrier spacing is decreased by Zi compared with a reference quantity of blind detection times that corresponds to the $i^{th}$ subcarrier spacing, wherein $1 \leq i \leq 4$, Z1 to Z3 are integers greater than or equal to 0, Z4 is an integer greater than 0, and the following conditions are satisfied: $Z1 \leq Z2 \leq Z3 \leq Z4$, and $Zi \leq Z_B i/2$, wherein $Z_B i$ is the reference quantity of blind detection times that corresponds to the $i^{th}$ subcarrier spacing.

11. A physical downlink control channel (PDCCH) blind detection apparatus, comprising:

a processor configured to determine a blind detection capability of the apparatus; and a transceiver configured to perform PDCCH blind detection in one time unit based on PDCCH configuration information and the blind detection capability of the apparatus that is determined by the processor, wherein the blind detection capability of the apparatus comprises N maximum quantities of blind detection times corresponding to N subcarrier spacings in the time unit and/or N maximum quantities of channel estimation control channel elements (CCEs) corresponding to the N subcarrier spacings in the time unit, wherein N is a positive integer;

for one of the N subcarrier spacings, a first ratio is greater than a second ratio, and for a subcarrier spacing other than the one subcarrier spacing in the N subcarrier spacings, a first ratio is not less than a second ratio; and/or for the one subcarrier spacing, a third ratio is greater than a fourth ratio, and for the subcarrier spacing other than the one subcarrier spacing in the N subcarrier spacings, a third ratio is not less than a fourth ratio; and the first ratio is a ratio of a maximum quantity of blind detection times that corresponds to the subcarrier spacing to a quantity of symbols comprised in the time unit, the second ratio is a ratio of a reference quantity of blind detection times that corresponds to the subcarrier spacing to a quantity of symbols comprised in one slot, the third ratio is a ratio of a maximum quantity of channel estimation CCEs that corresponds to the subcarrier spacing to the quantity of symbols comprised in the time unit, and the fourth ratio is a ratio of a reference quantity of channel estimation CCEs that corresponds to the subcarrier spacing to the quantity of symbols comprised in one slot.

12. The apparatus according to claim 11, wherein the time unit is one slot, when N is equal to 4, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, wherein $1 \leq i \leq 4$, W1 is greater than 1, W2, W3, and W4 are greater than or equal to 1, and the following conditions are satisfied: $W1 \geq W2 \geq W3 \geq W4$, and at least one of W1 to W4 is not equal to 2; or when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, wherein $1 \leq i \leq 4$, Z1 is an integer greater than 0, Z2, Z3, and Z4 are integers greater than or equal to 0, and the following conditions are satisfied: $Z1 \geq Z2 \geq Z3 \geq Z4$, and at least one of Z1 to Z4 is not equal to a reference quantity of blind detection times that corresponds to a corresponding subcarrier spacing.

13. The apparatus according to claim 11, wherein the time unit is a half slot, when N is equal to 4, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, wherein $1 \leq i \leq 4$, W1 is greater than 1, W2, W3, and W4 are greater than or equal to 1, and W1 to W4 satisfy the following condition: $W1 \geq W2 \geq W3 \geq W4$; or when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, wherein $1 \leq i \leq 4$, Z1 is an integer greater than 0, Z2 to Z4 are integers greater than or equal to 0, and the following condition is satisfied: $Z1 \geq Z2 \geq Z3 \geq Z4$.

14. The apparatus according to claim 11, wherein the time unit is a half slot, when N is equal to 4, in ascending order of the N subcarrier spacings, a maximum quantity of channel estimation CCEs that corresponds to the $i^{th}$ subcarrier spacing is Xi times a reference quantity of channel estimation CCEs that corresponds to the $i^{th}$ subcarrier spacing, wherein $1 \leq i \leq 4$, X1 is greater than 1, X2 to X4 are greater than or equal to 1, and the following condition is satisfied: $X1 \geq X2 \geq X3 \geq X4$; or when N is equal to 4, in ascending order of the N subcarrier spacings, a maximum quantity of channel estimation CCEs that corresponds to the $i^{th}$ subcarrier spacing is increased by Yi compared with a reference quantity of channel estimation CCEs that corresponds to the $i^{th}$ subcarrier spacing, wherein $1 \leq i \leq 4$, Y1 is an integer not equal to 0, Y2 to Y4 are integers greater than or equal to 0, and the following condition is satisfied: $Y1 \geq Y2 \geq Y3 \geq Y4$.

15. The apparatus according to claim 11, wherein the time unit is a half slot, wherein when N is equal to 4, in ascending order of the N subcarrier spacings, a maximum quantity of blind detection times that corresponds to the $i^{th}$ subcarrier spacing is 1/Wi of a reference quantity of blind detection times that corresponds to the $i^{th}$ subcarrier spacing, wherein 1≤i≤4, W1, W2, and W3 are greater than or equal to 1, W4 is greater than 1, and W1 to W4 satisfy the following condition: W1≤W2≤W3≤W4≤2; or when N is equal to 4, in ascending order of the N subcarrier spacings, a maximum quantity of blind detection times that corresponds to the $i^{th}$ subcarrier spacing is decreased by Zi compared with a reference quantity of blind detection times that corresponds to the $i^{th}$ subcarrier spacing, wherein 1≤i≤4, Z1 to Z3 are integers greater than or equal to 0, Z4 is an integer greater than 0, and the following conditions are satisfied: Z1≤Z2≤Z3≤Z4, and Zi≤$Z_B$i/2, wherein $Z_B$i is the reference quantity of blind detection times that corresponds to the $i^{th}$ subcarrier spacing.

16. A physical downlink control channel (PDCCH) sending apparatus, comprising:
a processor configured to determine PDCCH configuration information; and
a transceiver configured to send a PDCCH to a terminal device based on the PDCCH configuration information that is determined by the processor and a blind detection capability of the terminal device, wherein
the blind detection capability of the terminal device comprises N maximum quantities of blind detection times corresponding to N subcarrier spacings in one time unit and/or N maximum quantities of channel estimation control channel elements (CCEs) corresponding to the N subcarrier spacings in the time unit, wherein N is a positive integer;
for one of the N subcarrier spacings, a first ratio is greater than a second ratio, and for a subcarrier spacing other than the one subcarrier spacing in the N subcarrier spacings, a first ratio is not less than a second ratio; and/or for the one subcarrier spacing, a third ratio is greater than a fourth ratio, and for the subcarrier spacing other than the one subcarrier spacing in the N subcarrier spacings, a third ratio is not less than a fourth ratio; and
the first ratio is a ratio of a maximum quantity of blind detection times that corresponds to the subcarrier spacing to a quantity of symbols comprised in the time unit, the second ratio is a ratio of a reference quantity of blind detection times that corresponds to the subcarrier spacing to a quantity of symbols comprised in one slot, the third ratio is a ratio of a maximum quantity of channel estimation CCEs that corresponds to the subcarrier spacing to the quantity of symbols comprised in the time unit, and the fourth ratio is a ratio of a reference quantity of channel estimation CCEs that corresponds to the subcarrier spacing to the quantity of symbols comprised in one slot.

17. The apparatus according to claim 16, wherein the time unit is one slot,
when N is equal to 4, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, wherein 1≤i≤4, W1 is greater than 1, W2, W3, and W4 are greater than or equal to 1, and the following conditions are satisfied: W1≥W2≥W3≥W4, and at least one of W1 to W4 is not equal to 2; or when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, wherein 1≤i≤4, Z1 is an integer greater than 0, Z2, Z3, and Z4 are integers greater than or equal to 0, and the following conditions are satisfied: Z1≥Z2≥Z3≥Z4, and at least one of Z1 to Z4 is not equal to a reference quantity of blind detection times that corresponds to a corresponding subcarrier spacing.

18. The apparatus according to claim 16, wherein the time unit is a half slot,
when N is equal to 4, in ascending order of the N subcarrier spacings, a maximum quantity of blind detection times that corresponds to the $i^{th}$ subcarrier spacing is Wi times a reference quantity of blind detection times that corresponds to the $i^{th}$ subcarrier spacing, wherein 1≤i≤4, W1 is greater than 1, W2, W3, and W4 are greater than or equal to 1, and W1 to W4 satisfy the following condition: W1≥W2≥W3≥W4; or when N is equal to 4, in ascending order of the N subcarrier spacings, a maximum quantity of blind detection times that corresponds to the $i^{th}$ subcarrier spacing is increased by Zi compared with a reference quantity of blind detection times that corresponds to the $i^{th}$ subcarrier spacing, wherein 1≤i≤4, Z1 is an integer greater than 0, Z2 to Z4 are integers greater than or equal to 0, and the following condition is satisfied: Z1≥Z2≥Z3≥Z4.

19. The apparatus according to claim 16, wherein the time unit is a half slot,
when N is equal to 4, in ascending order of the N subcarrier spacings, a maximum quantity of channel estimation CCEs that corresponds to the $i^{th}$ subcarrier spacing is Xi times a reference quantity of channel estimation CCEs that corresponds to the $i^{th}$ subcarrier spacing, wherein 1≤i≤4, X1 is greater than 1, X2 to X4 are greater than or equal to 1, and the following condition is satisfied: X1≥X2≥X3≥X4; or when N is equal to 4, in ascending order of the N subcarrier spacings, a maximum quantity of channel estimation CCEs that corresponds to the $i^{th}$ subcarrier spacing is increased by Yi compared with a reference quantity of channel estimation CCEs that corresponds to the $i^{th}$ subcarrier spacing, wherein 1≤i≤4, Y1 is an integer not equal to 0, Y2 to Y4 are integers greater than or equal to 0, and the following condition is satisfied: Y1≥Y2≥Y3≥Y4.

20. The apparatus according to claim 16, wherein the time unit is a half slot,
wherein when N is equal to 4, in ascending order of the N subcarrier spacings, a maximum quantity of blind detection times that corresponds to the $i^{th}$ subcarrier spacing is 1/Wi of a reference quantity of blind detection times that corresponds to the $i^{th}$ subcarrier spacing, wherein 1≤i≤4, W1, W2, and W3 are greater than or equal to 1, W4 is greater than 1, and W1 to W4 satisfy the following condition: W1≤W2≤W3≤W4≤2; or when N is equal to 4, in ascending order of the N subcarrier spacings, a maximum quantity of blind detection times that corresponds to the $i^{th}$ subcarrier spacing is decreased by Zi compared with a reference quantity of blind detection times that corresponds to the $i^{th}$ subcarrier spacing, wherein 1≤i≤4, Z1 to Z3 are integers greater than or equal to 0, Z4 is an integer greater than 0, and the following conditions are satisfied: Z1≤Z2≤Z3≤Z4, and Zi≤$Z_B$i/2, wherein $Z_B$i is the reference quantity of blind detection times that corresponds to the $i^{th}$ subcarrier spacing.

* * * * *